United States Patent [19]
Pappas et al.

[11] Patent Number: 5,534,281
[45] Date of Patent: Jul. 9, 1996

[54] METHOD OF MAKING PRINTED BAKED GOODS

[75] Inventors: Chris Pappas, Ridgewood; Daniel A. Koppa, Bloomfield; Roger E. Skeels, Essex Fells; Agostino Aquino, Paterson, all of N.J.

[73] Assignee: Nabisco, Inc., Parsippany, N.J.

[21] Appl. No.: 347,168

[22] Filed: Nov. 23, 1994

Related U.S. Application Data

[60] Continuation of Ser. No. 972,505, Nov. 6, 1992, abandoned, which is a division of Ser. No. 682,834, Apr. 9, 1991, Pat. No. 5,162,119.

[51] Int. Cl.$^6$ ............................................ A21D 6/00
[52] U.S. Cl. .................... 426/383; 101/35; 101/169; 264/132; 425/94; 426/496
[58] Field of Search ............................ 426/383, 104, 426/496; 101/169, 35, 153, 157, 150, 36; 264/132; 425/94

[56] References Cited

U.S. PATENT DOCUMENTS

| | | |
|---|---|---|
| 200,589 | 2/1878 | Warner . |
| 614,408 | 11/1898 | Sherman . |
| 1,044,179 | 11/1912 | Horner . |
| 1,263,009 | 4/1918 | Williams . |
| 1,334,822 | 3/1920 | Varble ...................... 426/383 |
| 1,414,022 | 4/1922 | Huston . |
| 1,554,450 | 9/1925 | Maheu . |
| 1,621,863 | 3/1927 | Anderson . |
| 1,787,187 | 12/1930 | Brueshaber . |
| 1,883,184 | 10/1932 | Weber . |
| 1,886,231 | 11/1932 | Sague . |
| 1,968,848 | 8/1934 | Morse . |
| 2,078,847 | 4/1937 | Gray . |
| 2,176,122 | 10/1939 | Chapman . |
| 2,183,222 | 12/1939 | Luehrs . |
| 2,280,414 | 4/1942 | Koppinger . |
| 2,317,405 | 4/1943 | Rutten . |
| 2,346,163 | 4/1944 | Hiles . |
| 2,347,227 | 4/1944 | Wilgus . |
| 2,444,878 | 7/1948 | Marsh ........................................ 91/51 |
| 2,454,316 | 11/1948 | Haecks . |
| 2,952,204 | 9/1960 | Sherman . |
| 3,063,365 | 11/1962 | Johnson et al. . |
| 3,180,007 | 4/1965 | Gartz . |
| 3,344,753 | 10/1967 | Ramsey . |
| 3,446,143 | 5/1969 | Williamson . |
| 3,482,992 | 12/1969 | Benson . |
| 3,537,406 | 11/1970 | Ort . |
| 3,582,353 | 6/1971 | Fehr, Jr. et al. . |
| 3,603,249 | 9/1971 | Mumms et al. . |
| 3,650,773 | 3/1972 | Bush et al. ............................ 426/383 |
| 3,738,265 | 6/1973 | Saueressig ............................ 101/152 |
| 3,745,970 | 7/1973 | Scantlebury . |
| 3,812,782 | 5/1974 | Funahashi . |
| 3,827,356 | 8/1974 | Snow et al. . |
| 3,851,075 | 11/1974 | Wisdom . |
| 3,852,494 | 12/1974 | Williamson ............................ 426/383 |
| 3,911,155 | 10/1975 | Ferrero . |
| 4,098,184 | 7/1978 | Okada et al. . |
| 4,111,624 | 9/1978 | Hanson ................................. 426/383 |
| 4,216,714 | 8/1980 | Ackley, Sr. et al. . |
| 4,276,800 | 7/1981 | Koppa et al. . |
| 4,282,810 | 8/1981 | Ellis . |
| 4,285,978 | 8/1981 | Quinlivan . |

(List continued on next page.)

FOREIGN PATENT DOCUMENTS

| | | |
|---|---|---|
| 683094 | 6/1930 | France . |
| 2544254 | 10/1984 | France . |
| 54-6606 | 1/1979 | Japan . |
| 62-138279 | 6/1987 | Japan ..................................... 426/383 |
| 0104782 | 3/1917 | United Kingdom . |
| 722851 | 2/1955 | United Kingdom .................. 406/383 |

*Primary Examiner*—Steven Weinstein

[57] ABSTRACT

The present invention provides apparatus and a method for making printed foods such as cookies, crackers, and snacks at high production speeds on a continuous basis. The apparatus includes a rotary printer which is synchronized with dough forming apparatus such as a rotary cutter or rotary molder.

20 Claims, 22 Drawing Sheets

U.S. PATENT DOCUMENTS

| | | |
|---|---|---|
| 4,377,971 | 3/1983 | Ackley . |
| 4,384,006 | 5/1983 | Wallick . |
| 4,535,687 | 8/1985 | Antpöhler . |
| 4,578,273 | 3/1986 | Krubert . |
| 4,685,182 | 8/1987 | Lübke . |
| 4,702,926 | 10/1987 | Fowler . |
| 4,732,083 | 3/1988 | Arter . |
| 4,761,293 | 8/1988 | Herting ................... 426/383 |
| 4,778,365 | 10/1988 | Archer . |
| 4,988,276 | 1/1991 | Moeller . |
| 5,084,283 | 1/1992 | Oxley et al. . |

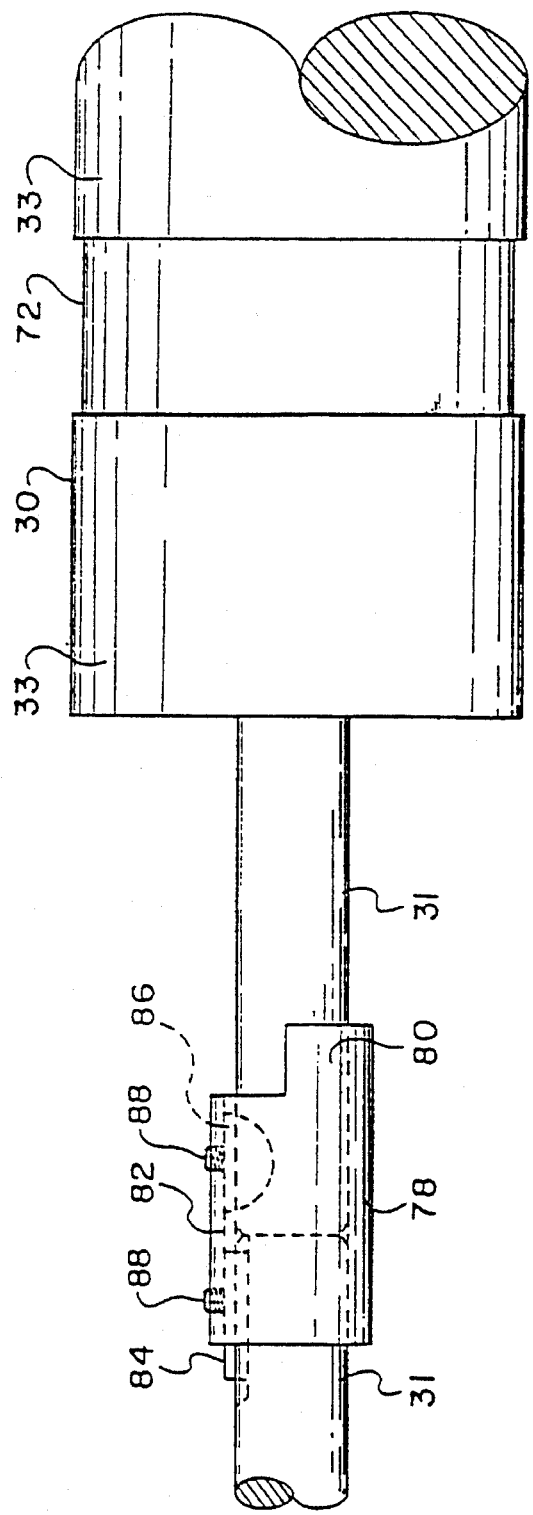
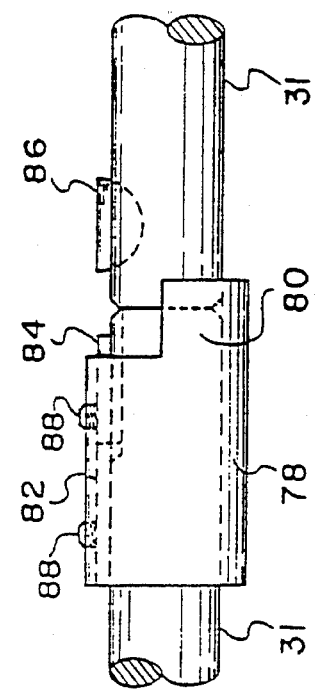
FIG. 6
FIG. 7

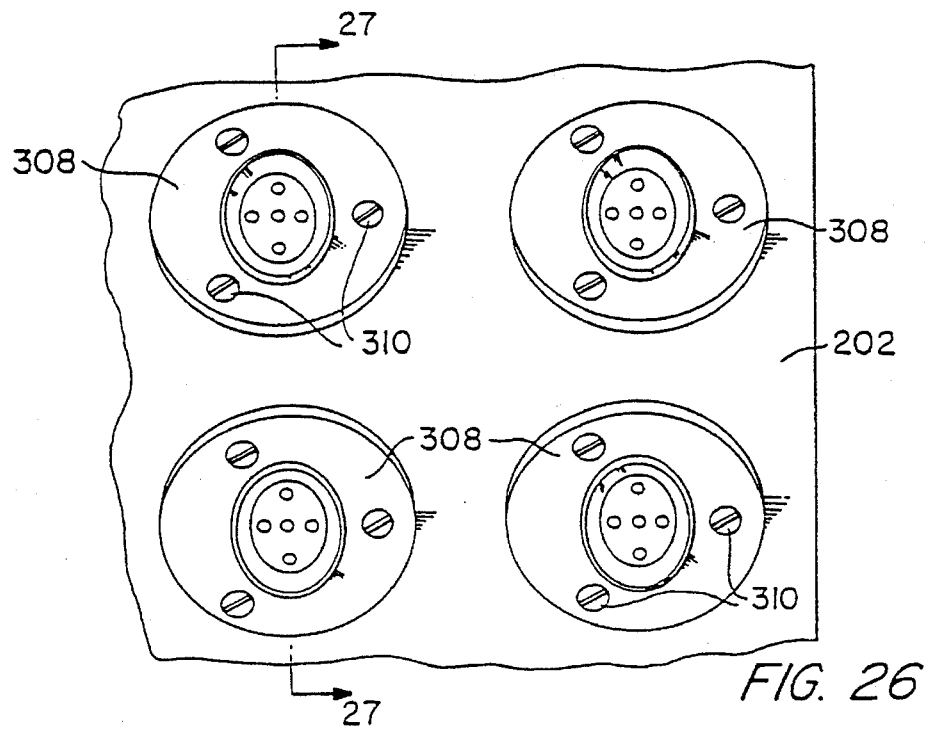
FIG. 26
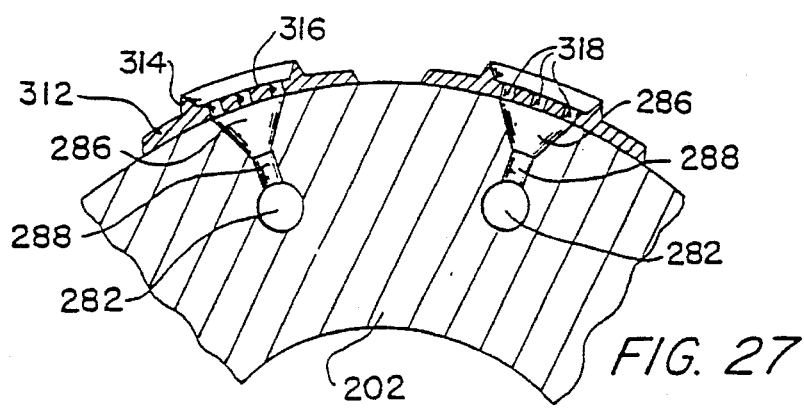
FIG. 27
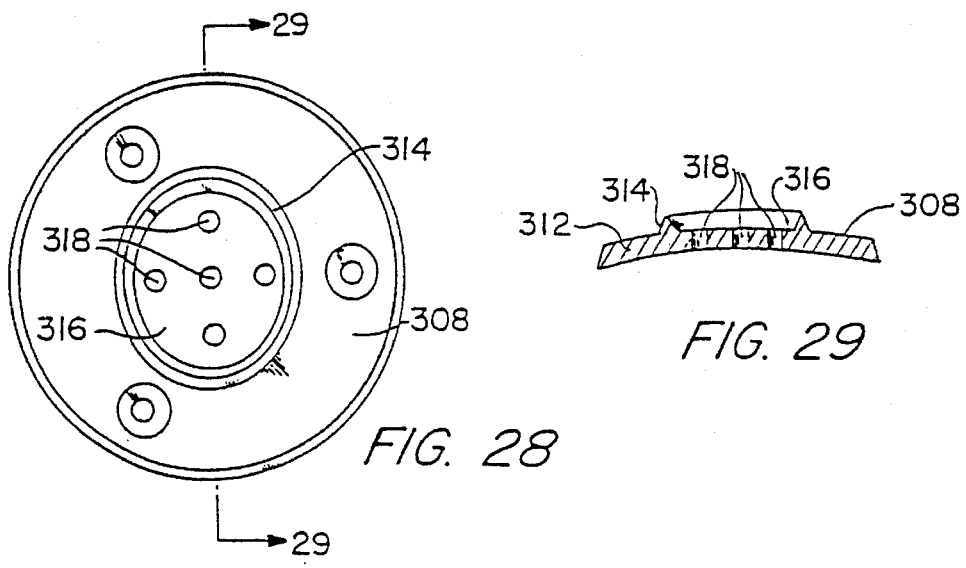
FIG. 28
FIG. 29

METHOD OF MAKING PRINTED BAKED GOODS

This application is a continuation of prior U.S. application Ser. No. 07/972,505, filed Nov. 6, 1992, now abandoned, which is a divisional of application Ser. No. 07/682,834, filed Apr. 9, 1991, now U.S. Pat. No. 5,162,119.

FIELD OF THE INVENTION

The present invention is directed to apparatus for making cookies, crackers, snacks, and other foods having a printed indicia or design thereon, and the method of making such foods.

BACKGROUND OF THE INVENTION

The present invention relates to the high speed, mass production of cookies, crackers, snacks, and other foods, which have a design or indicia printed thereon. The printing of foods is disclosed in U.S. Pat. No. 4,578,273 to Krubert and Japanese patent publication no. 54-6606 (published Jan. 18, 1979). According to the Japanese patent publication, printing on food or medical and pharmaceutical products using stamp-printing, flexographic printing and silk-screen printing is difficult because the product is likely to change its shape or is likely to be broken. Ink jet printing is used in the process of the Japanese patent publication.

U.S. Pat. No. 4,578,273 discloses that smearing or blotting are disadvantages in spraying or squirting coloring agents upon baked products to form a design, or in using silk screening procedures for imparting designs to cookies and other products. In the process of Krubert, an icing and ink combination is said to avoid blotting and to minimize breaking of the printed surface. The icing mixture forms a hard, non-porous, flat icing surface to which ink is transferred by a silicone pad. The design is contained on an engraved hardened steel flat plate. The ink is applied to the steel plate and squeegeed with a doctor blade to leave the etched ink design remaining on the plate and remove excess ink. The design is removed from the steel plate by contacting the plate with the silicone pad. The printing pads are somewhat domed to prevent the creation of suction upon contacting the hardened icing surface which might otherwise lift the product from mandrels as the pads are retracted after each design element is printed.

In the Krubert process, high speed mass production is limited by the need to retract the pads and the formation of only a single design on each pad. Furthermore, the process requires the use of an icing and a baked dough for applying the printing. The dough is formed by a rotary molder, but after the rotary molded pieces are baked and iced, each cookie is individually manually placed into a moving mandrel.

Printing on individual pieces, as in the proces of U.S. Pat. No. 4,578,273, requires alignment of the individual pieces for proper printing registration. Manual alignment is too limiting for the mass production rates at which multi-zoned band ovens can operate. It is also particularly difficult to align the pieces because they are arranged in rows across the band. Printing on pieces which are arranged in this manner requires registration in the direction of movement as well as transverse to it.

The problem of aligning individual pieces prior to a printing step may be eliminated by printing on a dough sheet. However, the cutting of the sheet into individual pieces must be synchronized with the printed portions. In addition, not all doughs possess the rheological properties for sheetability at high production rates. For example, cracker doughs are generally sheeted before forming the dough into pieces, whereas cookie doughs are often not sheetable at high production rates.

In producing baked goods from a sheeted dough, recycling of dough which remains after cutting of the individual pieces is often used to reduce costs. Extraneous ink transferred to or received on the waste portion of the dough sheet can contaminate or color the waste dough to be recycled. This can contaminate or color the next batch of dough to be formed into a dough sheet.

In the present invention, high speed, high definition printing of baked goods is achieved using a resilient printing roller which can conform to uneven surfaces to be printed upon. The printing can occur at various stages of making baked goods such as cookies, crackers, and snacks. For example, the printing step may take place: i) prior to or after a baking step, ii) before or after cutting a dough into individual pieces from a dough sheet, or iii) after forming the dough into individual pieces by a rotary molder. The printing of each indicia may be in one or more colors.

The cutting of a dough sheet in the present invention is coordinated automatically with the printing step to provide proper alignment and registration of the printed matter with the individual pieces while avoiding extraneous coloring of dough intended for recycling. In addition, the present invention provides automatic alignment for printing on individual pieces arranged in rows, which pieces have been formed, for example, by rotary molding.

SUMMARY OF THE INVENTION

The present invention is directed to printing and forming apparatus for making foods such as cookies, crackers, and snacks with indicia or designs printed thereon, and a method of making such types of food products. The printer is preferably of a rotogravure or rotary gravure offset type. Transfer rotary printing is preferably achieved with ink being transferred from an engraved inking roller to an offset silicone rubber printing roller and subsequently to the workpiece or food product. The process provides the transfer of printed matter with high resolution from the inking roller engraved with design or indicia onto the printing roller, which subsequently essentially wholly transfers the printed matter onto the food substrate. Further, the process provides a high speed printing operation. The Shore 00 Durometer reading (Shore Instruments and Manufacturing, Jamaica, N.Y.) for the silicone roller may be from about 20 to about 70, preferably from about 30 to about 60, most preferably from about 35 to about 45.

The printer of the present invention preferably includes a number of features to ensure that no excess or extraneous ink reaches the individual workpieces or the waste portion of the dough sheet from which the individual workpieces are formed, which waste portion is preferably subsequently recycled. These features include:

(1) an inking roller comprising a plurality of inking roller sections engraved with indicia or design (i.e. intaglio roller sections) and a spacing roller section separating the inking roller sections, the inking roller section having a predetermined diameter greater than the spacing roller section to provide a groove for retaining excess ink resulting from doctoring ink therein;

(2) an offset printing roller comprising a plurality of offset printing roller sections and a spacing roller section separating each of the offset inking roller sections, the offset printing roller sections having a predetermined diameter greater than the spacing roller section to provide a groove;

(3) the inking roller described above in (1) cooperating with the printing roller described above in (2) during the printing operation;

(4) a doctoring device cooperating with each of the inking rollers to remove excess ink from the surface thereof, and to direct the excess ink at least partially into the groove(s) of the inking roller to be retained there throughout the complete revolution of the inking roller due to the viscous nature of the ink or dye having adequate surface tension to remain in the groove and not spin off therefrom;

(5) inking roller sections of the ink roller which are wider than the printing roller sections of the printing roller to provide the spacing for different width spacing roller sections and resultant grooves;

(6) groove(s) of the printing roller which are wider than the groove(s) of the inking roller so that the edges of the printing roller sections do not interfere or contact with the excess ink retained within the groove(s) of the inking roller;

(7) an interrupter between the printing roller and workpiece or workpiece support;

(8) an interrupter between the printing roller and inking roller; and (9) an ink supply interrupter to the inking roller.

The use of a plurality of inking rollers, each of which has its own doctoring blade is preferred for printing across wide food conveyor widths because it facilitates: 1) obtaining a uniform tension in the doctoring blades across their width for even removal of excess ink, and 2) removal of the rollers for changing designs or cleaning.

The combined printing and forming apparatus according to the present invention is constructed for making printed cookies, crackers, snacks, and other baked goods or foods. Preferably, the apparatus includes a rotary offset printer of the type described above in combination with a rotary cutter or a rotary molder. The rotary cutter can be located either before or after the printer in the direction of travel of the advancing food workpieces. However, in the case of the rotary molder, the rotary molder must be positioned before the printer.

The printing and forming apparatus can be driven synchronously either independently or through a common drive. The drive or drives can include a variable speed control such as an infinitely variable speed control for registering the printing and forming operations in the direction of travel of the substrate to be printed upon ("the machine direction"). In a preferred embodiment using a common drive, this drive can include synchronous drive belts for maintaining the printer and cutter or molder in synchronization. In a preferred embodiment using separate drives, the printer and cutter or molder may be synchronized electronically using a vision or scanning device to detect the position of the trailing or leading edge of the piece in the machine direction for each piece in a given row. The relative rotational position of the printer, or rotary molder or rotary cutter, preferably the rotational position of the printer, may then be adjusted based upon the detected position, to obtain the desired registration of the printed image on the substrate.

The rotary printing apparatus of the present invention may be used to print on a dough sheet before or after it is partially or completely cut. It may also be used to print on individual pieces. The printing may occur before or after baking.

For producing printed crackers, the cutter of the present invention is preferably a rotary cutter. The preferred rotary cutter is constructed so as to have a plurality of individual cutters positioned in rows which are transverse to the direction of movement of the food sheet. The rotary cutter includes a drum having a plurality of air passageways leading to the surface of the drum at positions where the individual cutters are positioned. A manifold plate located at one end of the drum provides a supply of air to these air passageways as the entrances to these air passageways pass through a bottom position of rotation of the drum. The air supplied to these air passageways prevent the individual cutters from picking up the individual food pieces after being cut from the food sheet by blowing or maintaining a positive pressure between the cutters and the individual food workpieces being cut. The manifold plate supplies air to these passageways by means of a pressurized cavity or air supply port provided in the manifold plate registering with the entrances to the air passageways of the drum as they pass through the lower position of rotation of the drum.

For producing printed cookies according to the present invention, individual pieces are preferably formed on a conveyor in a particular arrangement by a rotary molder to accomplish alignment and registration with the printer. The pieces are subsequently transferred in this arrangement to the printer for the printing operation.

In embodiments of the present invention, multi-colored images may be printed on the substrate using a plurality of the rotary printers arranged serially for serially applying different colors to the substrate. Each of the printers may be driven individually or in combination with each other. One or more of the printers may be driven in combination with the rotary cutter or rotary molder. Synchronization may be accomplished mechanically using belts and pulleys or electronically.

BRIEF DESCRIPTION OF THE DRAWINGS

FIG. 6 is a partial front elevational view of the printing roller illustrating the quick-release roller coupling;

FIG. 7 is a front elevational view of the roller coupling in a position for removal or installation of the printing roller;

FIG. 26 is an enlarged view of a portion of FIG. 21, showing the detail of the individual cutters;

FIG. 27 is a cross-sectional view, taken along line 27—27 of FIG. 26;

FIG. 28 is a detailed top plan view of a detached individual cutter;

FIG. 29 is a detailed side cross-sectional view of the cutter shown in FIG. 28;

DETAILED DESCRIPTION OF THE INVENTION

Figure 1:
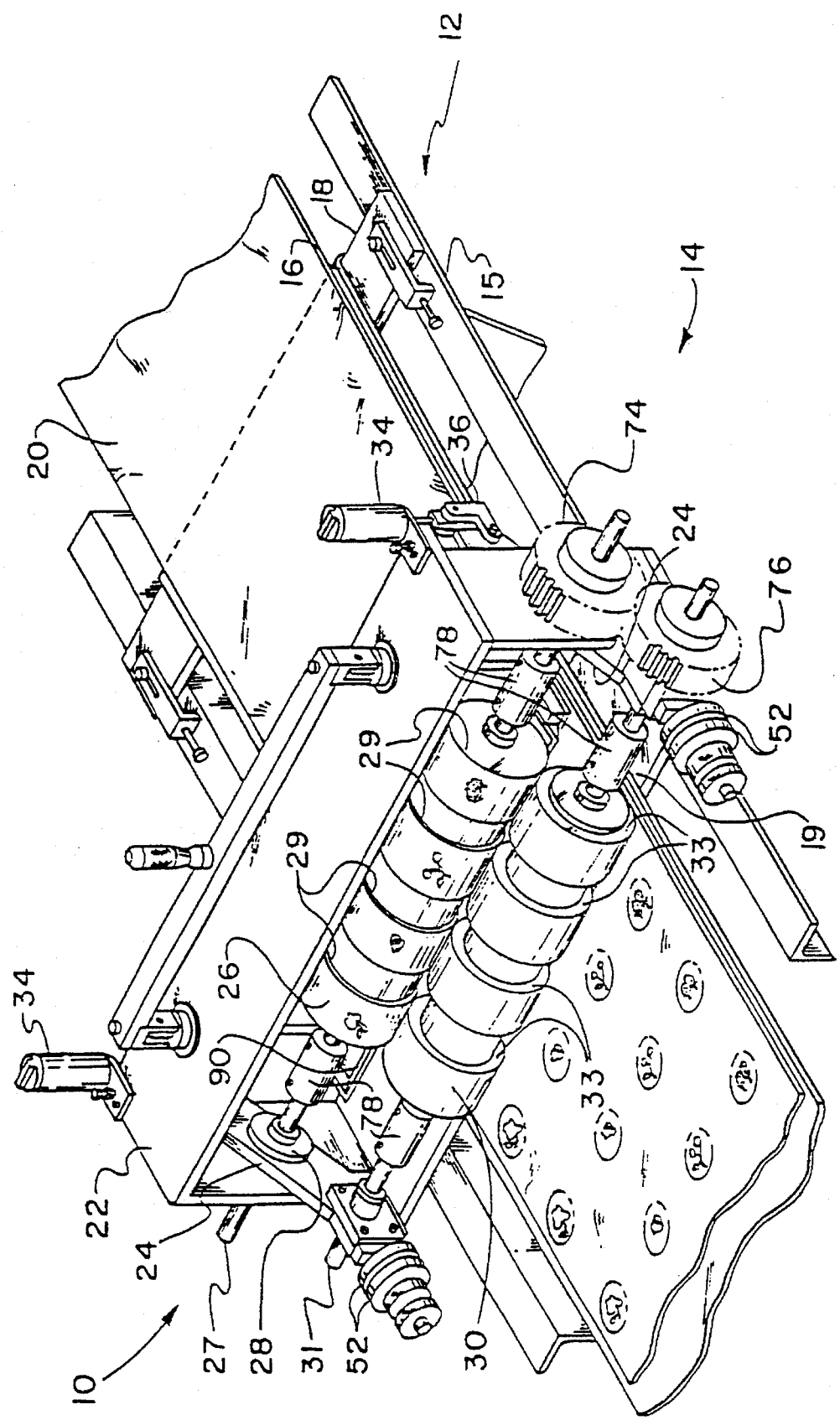
FIG. 1 is a perspective view of a printing apparatus according to the present invention.

The present invention relates to the mass production of printed food items by the high speed transferring of a design or indicia to the food surface at a plurality of locations across a moving conveyor belt. The locations are preferably in a direction substantially transverse to the direction of movement of the conveyor belt. The use of at least one rotary inking roll and at least one resilient rotary printing roll having a plurality of designs or indicia across the length and around the circumference of each roll provides for high speed, sharp, clean printing without damage to the food. The transfer may be synchronized with the formation of individual food pieces automatically by the use of belts or electronically, for example. The food pieces may be formed either before or after printing.

By rotary printing on a dough sheet prior to formation into individual pieces by cutting, or forming the dough sheet into individual pieces by cutting the dough sheet on an advancing conveyor prior to the printing step, the individual pieces can be kept in printing registration by coordinating the rate of advance of the moving dough sheet with the printer rotation rate. In either situation, the cutting step is coordinated with the printing step to provide proper alignment and registration of the printed matter with the individual pieces in the lateral or transverse direction and in the longitudinal or machine direction.

This embodiment provides registration in the longitudinal or machine direction by providing a variable speed drive for synchronizing the printer and cutter. Any registration problem is further alleviated by utilizing a rotary cutter that maintains the dough sheet in contact with the conveyor and avoids pulling up of the dough sheet off the conveyor by the individual cutters during the cutting operation.

In the present invention excess or extraneous ink is prevented from reaching the dough sheet during the printing operation. A waste dough sheet portion, resulting, for example, by cutting the dough sheet into individual pieces, is generally recycled with new raw material to form a new dough sheet to prevent dough waste. In the present invention, extraneous ink or ink particles are not transferred to or received on the waste portion of the dough sheet so as to avoid contamination or coloring of the waste dough to be recycled and the next batch of dough to be formed into a dough sheet.

Another embodiment of the present invention overcomes the problem of aligning individual pieces for printing by rotary printing on individual pieces that are rotary molded in alignment onto an advancing conveyor.

The present invention overcomes an additional problem of printing on uneven surfaces such as the surfaces of raw or fully baked individual snack dough pieces. The surfaces of the pieces, besides being uneven, are also porous. In order to print on these pieces with high definition, the printer of the present invention preferably utilizes an offset resilient silicone rubber printing roller. The surface of the silicone rubber printing roller conforms to the uneven surfaces of the pieces being printed upon and at least substantially or completely transfers a high resolution printed image to the surfaces thereof, without deforming the pieces.

An embodiment of the printing apparatus according to the present invention is shown in FIG. 1. The printing apparatus 10 includes conveying means such as belt conveyor 12 and printer 14.

The belt conveyor 12 is constructed of a conveyor support 15 with a conveyor belt 16 slidably mounted thereon. A belt tensioning device 18 is provided for tensioning the conveyor belt 16 during operation. A platen such as plate 19 supports the conveyor belt 16 beneath the printer 14 in order to support dough sheet 20 during the printing operation so that adequate pressure can be applied between the printing roller and the dough sheet 20 to ensure thorough ink transfer.

Figure 2:
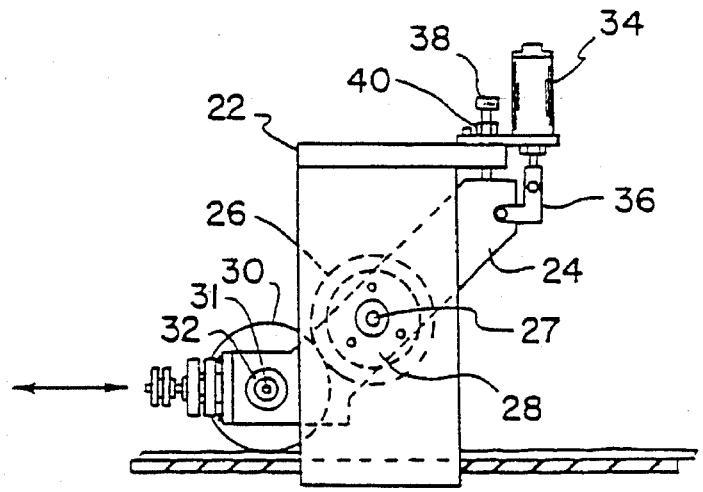
FIG. 2 is a side elevational view of the printing apparatus, shown in FIG. 1.

The printer 14 comprises a printer support 22 on which a pair of support arms 24 are pivotally mounted, as shown in FIG. 2. An inking roller 26 is supported on a shaft 27 that is rotatably mounted by bearings 28 on the support arms 24. In the embodiment shown in FIGS. 1 and 2, the support arms 24 pivot about the same axis as the axis of rotation of the inking roller 26.

The inking roller 26 includes a plurality of inking roller sections 29. The inking roller sections 29 are made of a hard material such as steel, and are engraved with indicia or design(s). For example, the printer shown in FIG. 1 includes inking roller sections that are engraved with different designs of an apple, lemon slices, cherry bunch, and strawberries, respectively. A printing roller 30 is supported on a shaft 31 that is rotatably supported by bearings 32 on the support arms 24 so as to cooperate and peripherally engage with the inking roller 26 during the printing operation. The printing roller 30 is constructed with a plurality of printing roller sections 33.

As shown in FIG. 2, the support arms 24 are pivoted by means of actuators such as air cylinders 34 with substantially L-shaped link connectors 36 pivotally connecting the support arms 24 to the air cylinders 34. The L-shaped link connectors 36 are pivotally connected to the ends of the support arms 24 located opposite to the ends that support the printing roller 30. Further, the support arms 24 are pivoted at positions located between the ends of the support arms 24. The actuators are connected at substantially opposite ends of the pair of support arms 24 for pivoting the support arms 24 on printer support 22 to place the offset printing roller 30 into and out of printing engagement with a substrate to be printed upon.

Stop devices such as screws 38 extending through the printer support 22 and provided with lock nuts 40 limit the movement of the support arms 24 in a direction that places the printing roller 30 in contact with the dough sheet 20 to limit the printing pressure. The air cylinders 34 are used to interrupt the contact of the printer roller 30 with the dough sheet 20 which is supported by platen 19.

Figure 3:
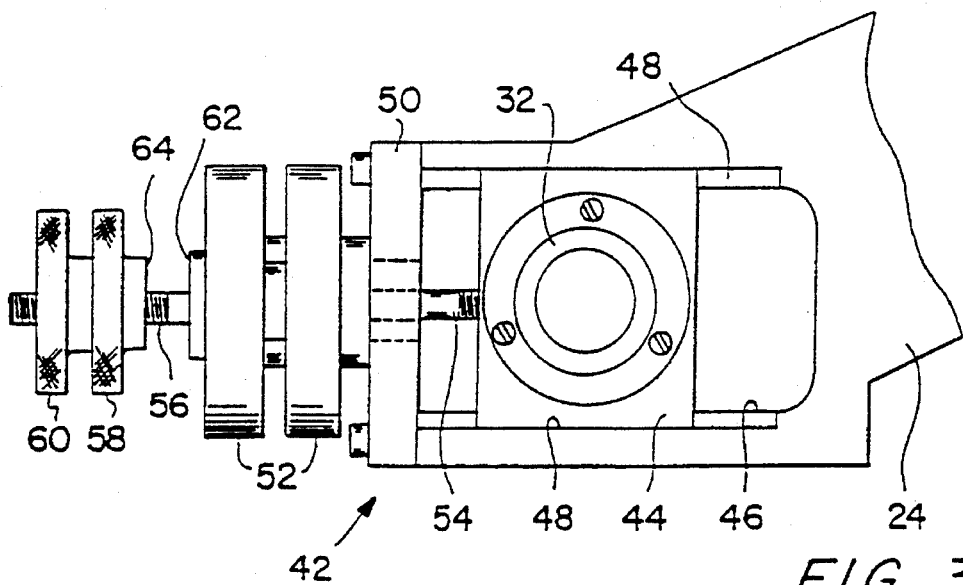
FIG. 3 is a partial detailed side elevational view of a lower end of a support arm on which the printing roller is mounted.

The printer 14 can be provided with an interrupter between the inking roller 26 and the printing roller 30 to interrupt the offset printing process. An example of an interrupter useful for this purpose, is shown in FIG. 3. The interrupter 42 comprises support blocks 44 slidably disposed within openings 46 along guides 48 of the support arms 24. The support arms 24 are provided with end caps 50, which support air cylinders 52. The air cylinders 52 are connected to the support blocks 44 via rods 54 having threaded end portions.

Figure 4:
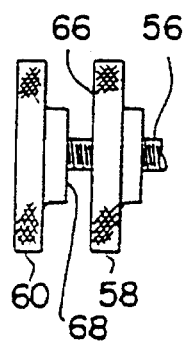
FIG. 4 is a detailed side elevational view of a locking mechanism for the air cylinder, as shown in FIG. 3, in a disengaged position ready for adjustment.

The air cylinders 52 can include stop devices each defined by a threaded portion 56 of the rod 54 having an adjusting nut 58 screwed thereon. The adjusting nut 58 can be rotated to vary the throw length of the rod 56 of the air cylinder 52. A locking nut 60 is also screwed onto the threaded portion 56 to lock the adjusting nut 58, after being adjusted into position, onto rod 56. A stop surface 62 located on the casing of the air cylinder 52 engages with a stop surface 64 of the adjusting nut 58 to limit the movement of the rod 56, in the rightward direction in FIG. 3. A stop surface 66 of the adjusting nut 58 engages with a stop surface 68 of the locking nut 60, as shown in FIG. 4, when the locking nut 60 is tightened against the adjusting nut 58.

ROLLER STRUCTURES

Figure 5A:
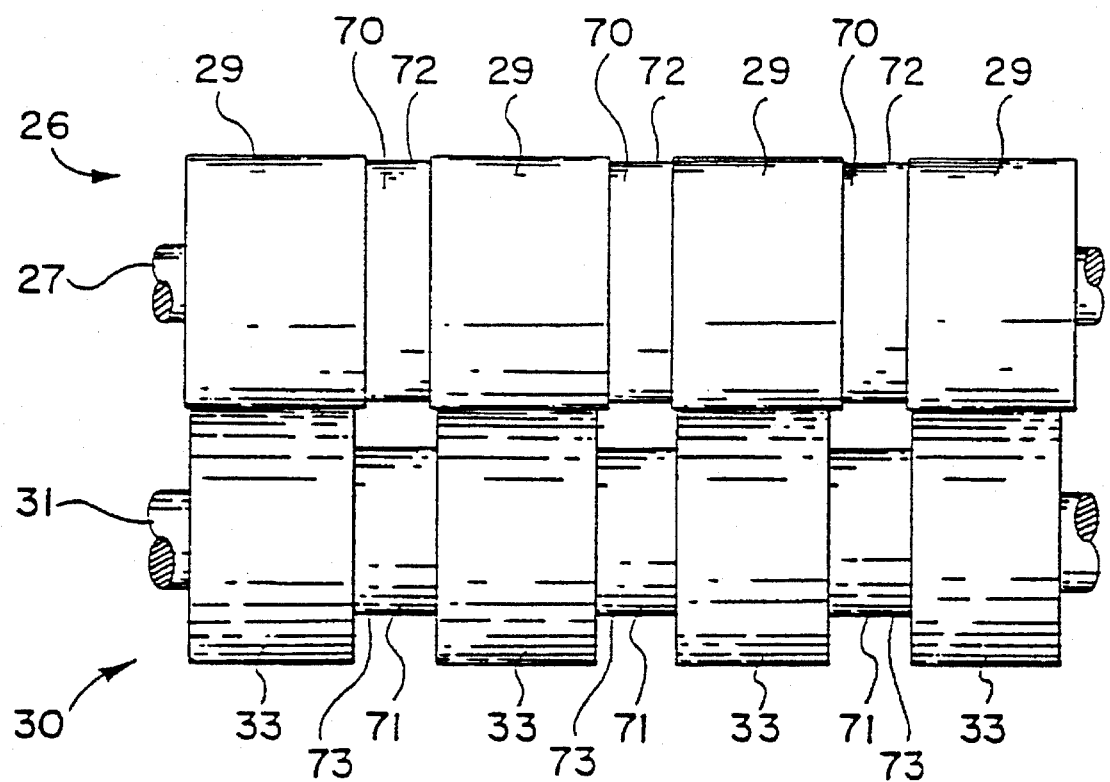
FIG. 5A is a top view of the printing and inking rollers, broken away from the support.

The detailed structure of the inking roller 26 and printing roller 30, are shown in FIG. 5A. The inking roller 26 comprises a plurality of inking roller sections 29 separated by spacing roller sections 70. The inking roller sections 29 are preferably metallic and have a diameter greater than the diameter of the spacing roller sections 70.

The printing roller 30 comprises printing roller sections 33 separated by spacing roller sections 71. The printing roller sections 33 have a diameter greater than the diameter of the spacing roller sections 71.

A plurality of grooves 72 are defined between adjacent inking roller sections 29 to provide a space for receiving excess ink during the inking operation of the inking roller 26. The depth of the grooves 72 are selected to be sufficiently shallow so that excess ink remaining in the grooves 72 after inking, remains adhered within the grooves 72 due to the surface tension of the ink preventing the ink from spinning off during rotation of the inking roller 26 during the printing operation. Also, a plurality of grooves 73 are defined between adjacent printing roller sections 33.

The grooves 73 of the printing roller 30 are preferably wider than the grooves 72 of the inking roller 26, so that the edges of the printing roller sections 33 do not contact with ink contained in the grooves 70 of the inking roller 26 during peripheral engagement of the inking and printing rollers while in the printing mode.

Figure 5B:
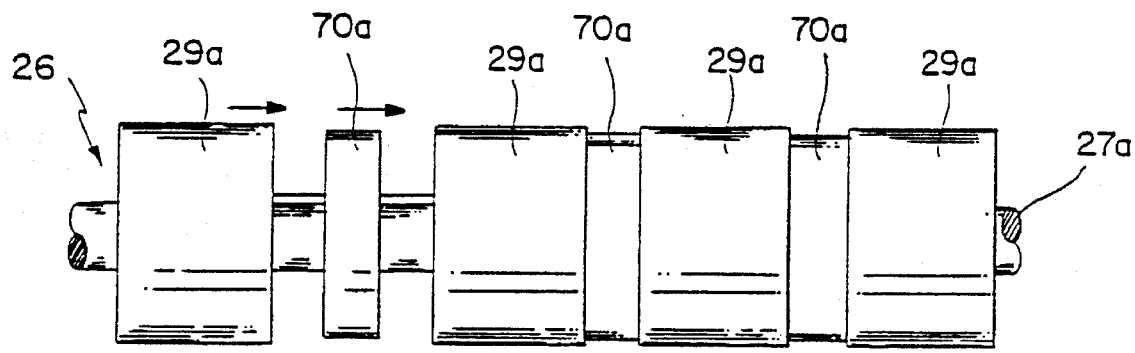
FIG. 5B is a front view of the inking roller during assembly.
Figure 5C:
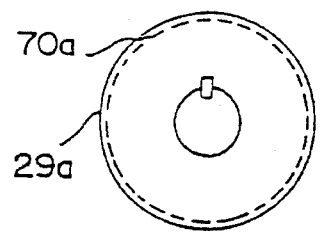
FIG. 5C is a side view of the inking roller, shown in FIG. 5B.
Figure 5D:
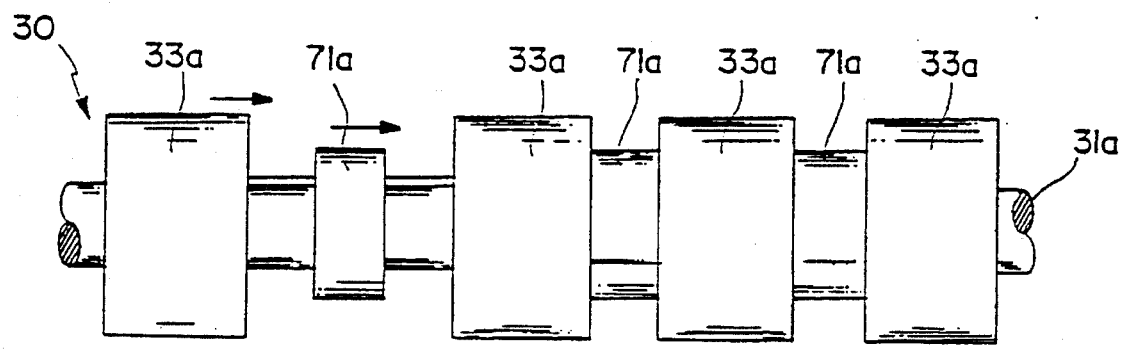
FIG. 5D is a front view of the printing roller during assembly.
Figure 5E:
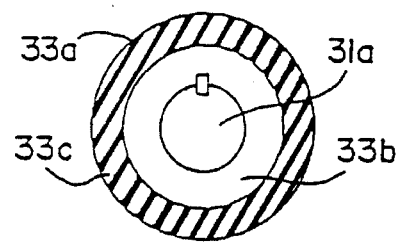
FIG. 5E is a side view of the printing roller, shown in FIG. 5D.

The inking roller 26 can be constructed of separate engraved inking rollers 29a and spacing roller sections 70a mounted on shaft 27a, as shown in FIG. 5B. The inking rollers 29a and spacing rollers 70a are provided with center bores having keyways so that these rollers can be slid over one end of the shaft 27a during construction and keyed onto shaft 27a (See FIG. 5C) to prevent the rollers from rotating on the shaft 27a, once assembled. Similarly, the printing roller 30 can be constructed of separate printing roller sections 33a and spacing roller sections 71a, as shown in FIG. 5D. The printing rollers 33a and spacing rollers 71a are provided with center bores having keyways so that these rollers can be slid over one end of the shaft 31a during construction and keyed onto shaft 31a (See FIG. 5E) to prevent the rollers from rotating on the shaft 31a, once assembled. Further, each printing roller 33a is constructed of a center roller 33b having a cover 33c, for example, made of silicone rubber mounted thereon.

The Shore 00 Durometer reading (Shore Instruments and Manufacturing, Jamaica, N.Y.) for the silicone roller may be from about 20 to about 70, preferably from about 30 to about 60, most preferably from about 35 to about 45. At readings below about 20, the roller cover 33(C) is generally too soft and at readings above about 70, the roller is generally too hard for high resolution transfer of printed matter to the substrate food product.

The use of a plurality of inking rollers and a plurality of printing rollers facilitates roller removal for cleaning or replacement. It also provides flexibility in the variety of different designs which can be used without complete replacement of the roller assembly.

In the embodiment of the printer 14 shown in FIG. 1, the inking roller 26 is driven at one end by a drive (not shown). The printing roller 30 is driven by the inking roller, which is coupled to the printing roller 30 by gears 74 and 76. However, other roller driving arrangements can be substituted for the one shown and described.

Quick-Release Roller Couplings

Both the inking roller 26 and printing roller 30 can be easily and quickly removed from and mounted to the printer 14 by quick-release couplings. For example, a quick-release coupling 78 is shown connected to the printing roller 30 in a printing roller installed position in FIG. 6, and in a position ready for removal of the printing roller in FIG. 7. The quick-release coupling 78 is bored along its length to a diameter approximately the same as or slightly larger than the diameter of shaft 31, and is provided with a saddle portion 80. The coupling 78 can be provided with a keyway 82 and separate portions of the shaft 31 can be provided with, for example, a square key 84 and Woodruff key 86 for locking the separate portions of the shaft 31 together during operation. Further, locking means for preventing the coupling 78 from moving laterally during operation can be provided, for example, by a pair of allen head screws 88.

Ink Supply

Figure 8:
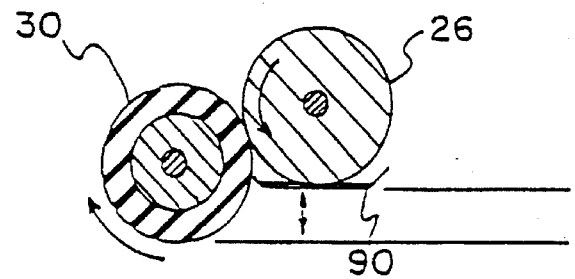
FIG. 8 is a side diagrammatical view of the inking roller and printing roller combination with the inking roller partially submerged in the inking tray.
Figure 9:
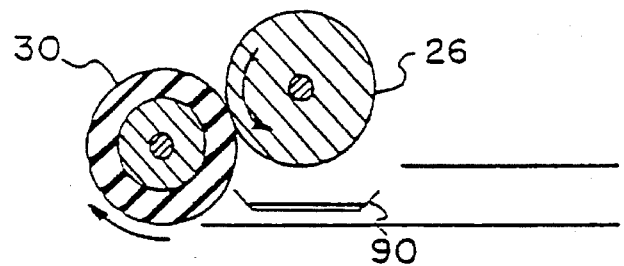
FIG. 9 is a side diagrammatical view of the inking roller and printing roller combination with the inking tray positioned out of contact with the inking roller during ink supply interruption.
Figure 10:
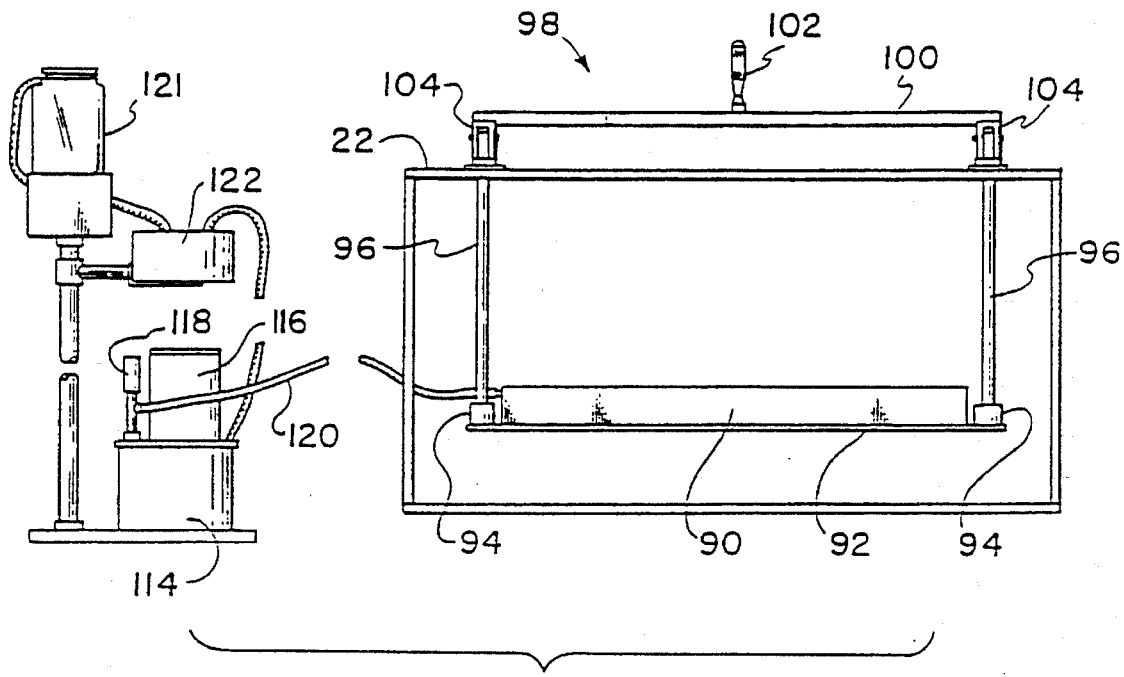
FIG. 10 is a front elevational view of the printing apparatus with the inking and printing rollers removed in order to view the details of the inking mechanism.

The inking roller 26 can be supplied with ink by various means. For example, ink or dye is supplied to the inking roller 26 by means of an ink tray 90, as shown in FIGS. 8, 9 and 10. The positioning of the ink tray 90 relative to the inking roller 26 during the printing operation, is shown in FIG. 8. The ink tray 90 can be provided with an interrupter mechanism that lowers the tray containing ink below the inking roller 26 to an interruption position, as shown in FIG. 9.

Figure 11:
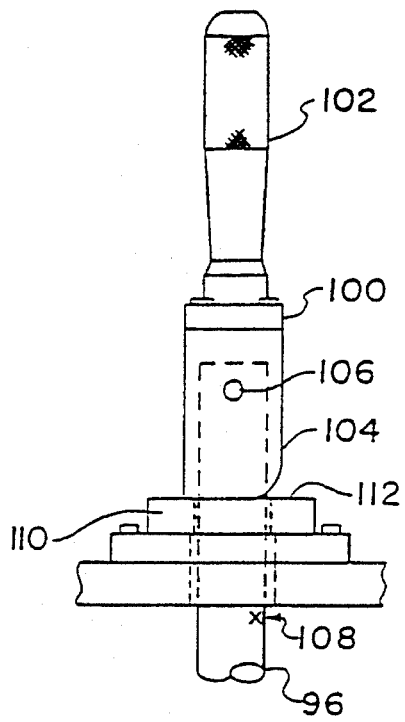
FIG. 11 is a side elevational view of the ink tray support toggle mechanism, in an ink tray raised position.
Figure 12:
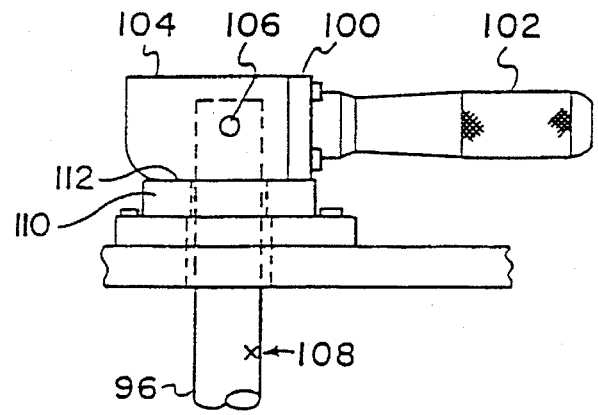
FIG. 12 is a side elevational view of the ink tray support toggle mechanism, shown in FIG. 11, in an ink tray lowered position.

An example of the interrupter mechanism, is shown in FIG. 10. The ink tray 90 can be supported on a horizontally oriented member such as ink tray support 92 provided with connector blocks 94. The support plate 92 is suspended or hung from vertically oriented members such as rods 96. The rods 96 are connected to a toggle mechanism 98 supported above the printer support 22. The toggle mechanism 98 can comprise an actuating bar 100 having a handle 102, and connected to toggle levers 104. The toggle levers 104 are pivotally connected to the rods 96 by means such as pins 106, as shown in FIGS. 11 and 12. The toggle mechanism is shown in the tray raised position in FIG. 11, and in the tray lowered position in FIG. 12. A reference mark 108 indicates the comparative heights of the rod in the raised and lowered positions. The toggle levers 104 can be supported by flanges 110, with bearing surfaces 112, positioned on top of the printer frame 22.

Ink can be supplied to the ink tray 90 by the batch transfer of quantities of ink to the ink tray. However, it is preferable that the ink tray 90 is provided with a continuous supply of replenishing ink. For example, an ink supply including an ink reservoir 114 with a stirrer (not shown), a stirrer motor 116 and ink pump 118 can be provided to supply ink, as shown in FIG. 10. The ink pump 118 is connected to the ink tray 90 via supply hose 120 to supply a continuous supply of ink. Further, an ink solvent reservoir 121 and ink viscosity control 122 can be provided for maintaining the ink at a constant pre-selected viscosity within the ink reservoir 114 by sensing the viscosity within the ink reservoir 114 and adding solvent as needed to prevent thickening of the ink with time.

Each printing roller section 33(a) may be supplied with ink from a common ink tray or from individual ink trays. Different colored indicia may be produced by each printing roller section 33(a) when separate ink trays, filled with different colored inks, are used.

Doctor Blade Assembly

Figure 13:
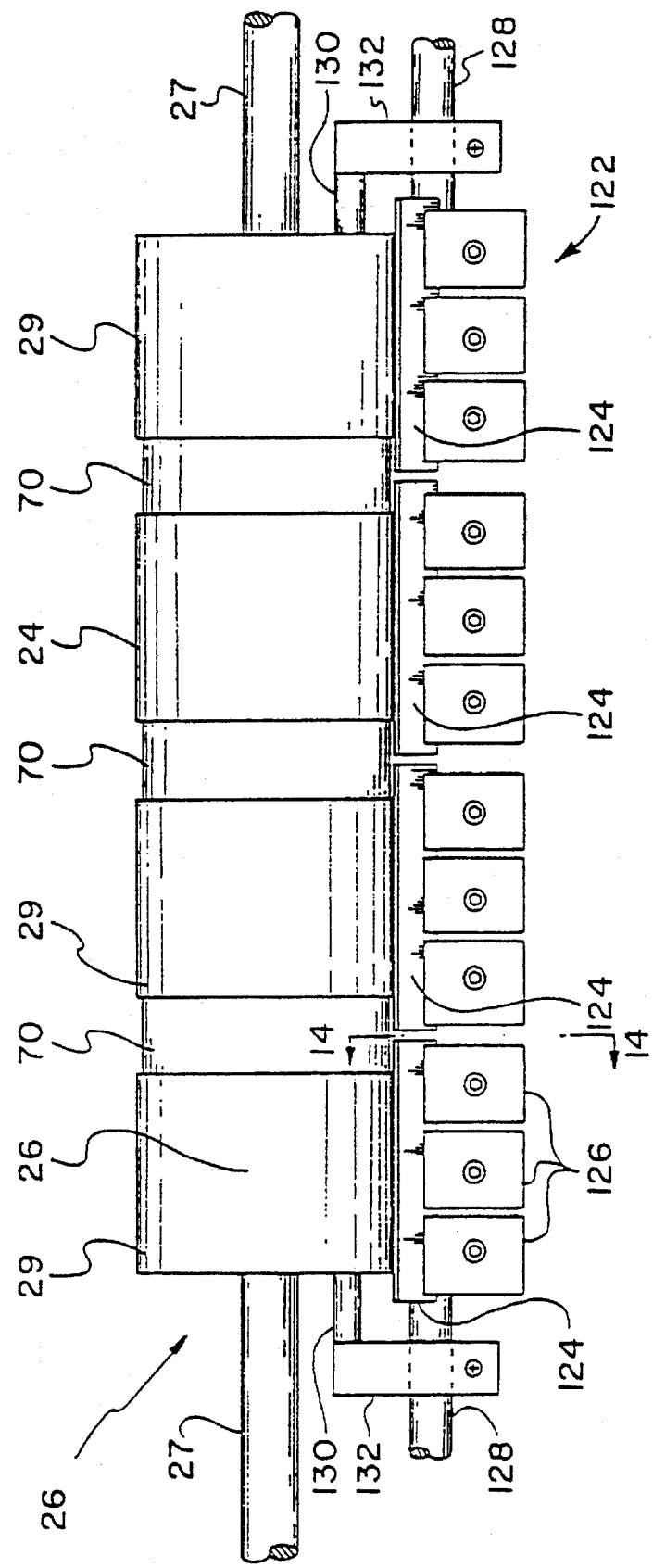
FIG. 13 is a detailed top view of the inking roller and doctor blade combination with the support structure removed to facilitate viewing.

The inking roller 26 can be provided with various means for metering or doctoring excess ink from the surface of the inking roller 26, after rotating through the ink tray 90. For example, a doctor blade assembly 122, of the type shown in FIG. 13, is provided with the printer 14. In order to ensure an even distribution and removal of ink from the surface of the inking roller 26, the doctor blade assembly 122 preferably comprises a plurality of doctor blade sections 124 with one doctor blade section 124 provided for each inking roller section 29. Each doctor blade section 124 is supported by a plurality of clamping assemblies 126. The clamping assemblies 126 are supported on a support member such as a support shaft 128. The ends of the inking roller 26 can be provided with end wipers 130. The end wipers 130 are supported on support shaft 128 by wiper supports 132.

Figure 14:
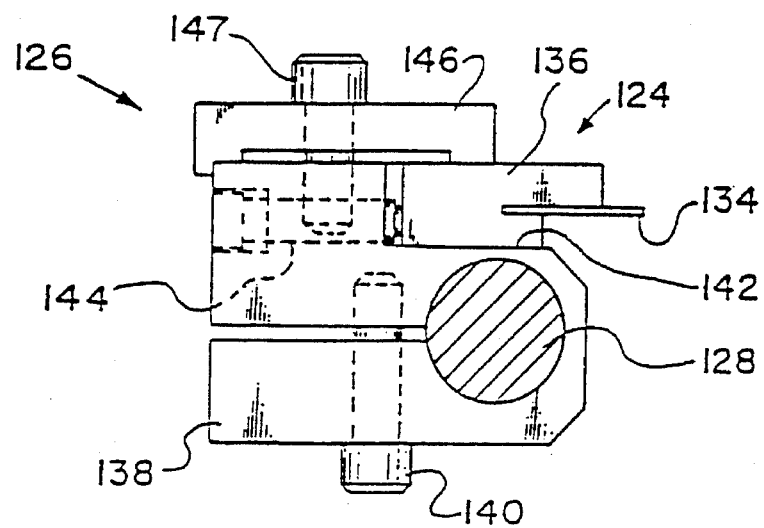
FIG. 14 is a detailed side view of a doctor blade holder, taken along line 14—14 of FIG. 13.

A detailed side view of a doctor blade section 124 and clamping assembly 126, are shown in FIG. 14. The doctor blade section 124 comprises a thin steel blade 134 mounted in a blade support 136. The clamping assembly 126 comprises a clamping block 138 having a bolt 140 for tightening the clamping block 138 against the support shaft 128. Further, the clamping block 138 is provided with a guide surface 142 against which the blade support 136 slidably abuts, and one or more adjusting screws 144 for adjusting the positioning of the doctor blade section 124 relative to the inking roller 26. A clamp 146 is secured to the top of the clamping block 138 by bolt 147 for clamping the doctor blade section 124 in place on the clamping block 138. The use of a plurality of doctoring blades and a plurality of inking rollers facilitates attainment of even pressure across the inking roll for uniform ink distribution and removal. This arrangement is particularly advantageous when printing across wide conveyor bands, such as 3 to 4 feet in width.

Control System

Figure 15:
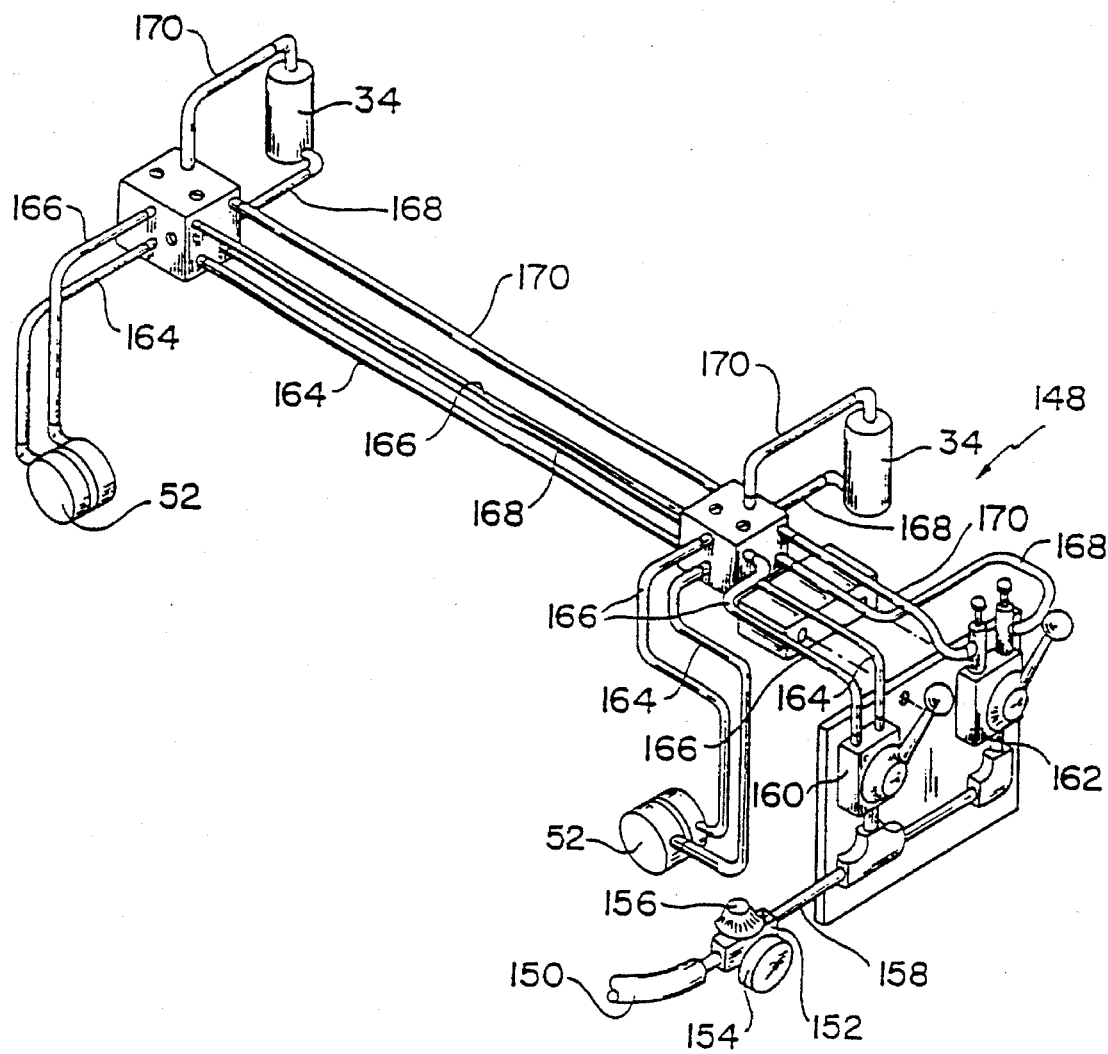
FIG. 15 is a schematic perspective view of the pneumatic drive system for operating the air cylinders of the two roller interrupters.

The printer 14 is provided with a control system 148, as shown in FIG. 15. The control system can be operated by hydraulic or pneumatic power. For example, an air supply (not shown) such as an air compressor is connected to the control system 148 via pressure hose 150. A pressure valve 152 having a gauge 154 and finger adjuster 156 is connected in the supply line 158 leading to the control valves 160 and 162. The control valve 160 controls the flow of air through pressure lines 164 and 166 leading to air cylinders 52 for operating the interrupter 42 (shown in FIG. 3) between the inking roller 26 and printing roller 30 (shown in FIG. 2). The control valve 162 controls the flow of air through pressure lines 168 and 170 leading to air cylinders 34 for controlling the interrupter 42 between the printing roller 30 and the platen supported dough sheet 20.

Printing and Cutting Apparatus

Figure 16:
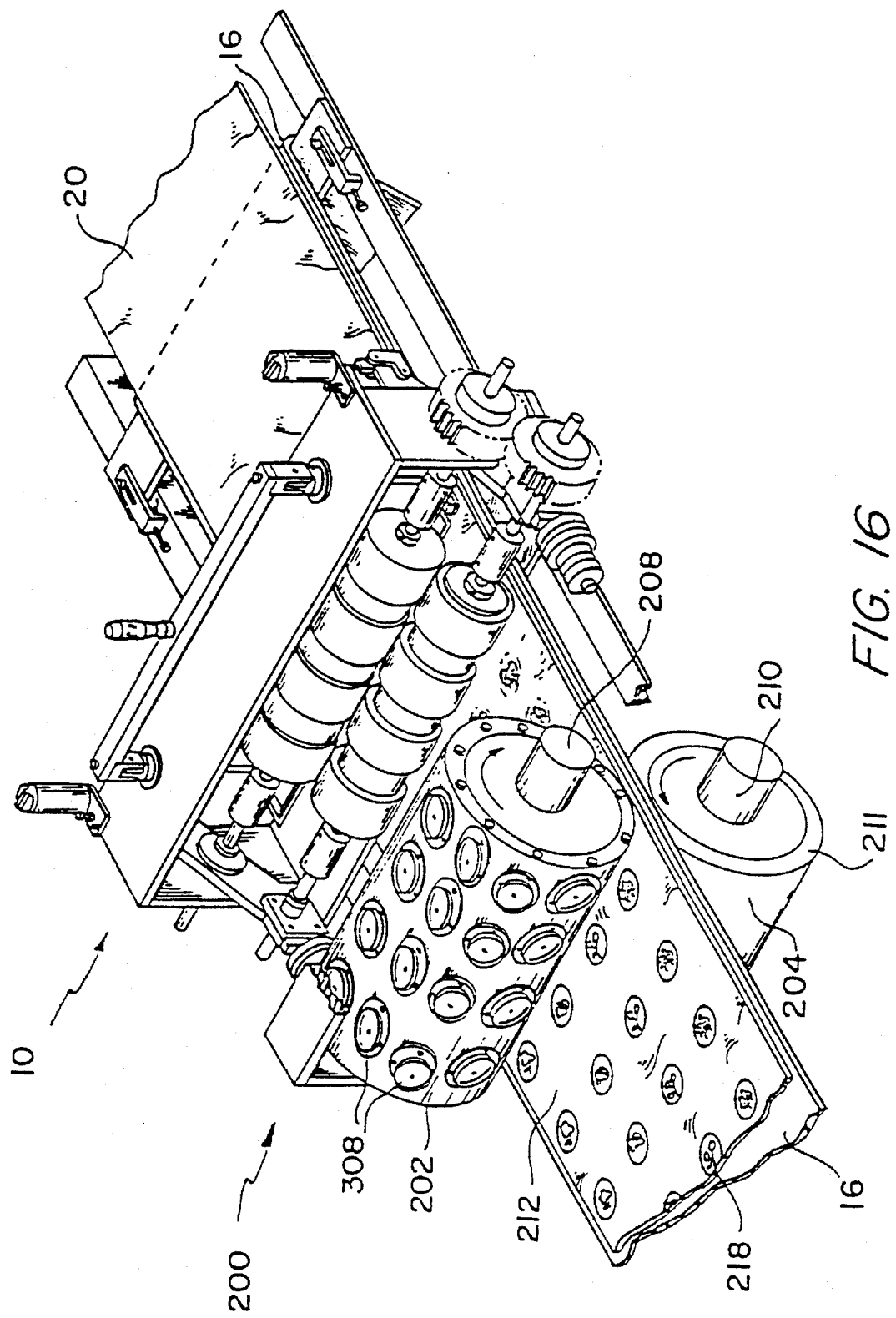
FIG. 16 is a perspective view of a combined printing and cutting apparatus according to the present invention.

An embodiment of the combined printing and cutting apparatus according to the present invention, is shown in FIG. 16. The printing apparatus 10 described above can be utilized with a rotary cutting apparatus 200 of the type described in detail below, and shown in FIG. 16. However, other printers or cutters can be substituted in the combined apparatus.

The rotary cutting apparatus 200 comprises a drum 202 and a rotary platen 204 mounted on a support frame (not shown). The drum 202 is supported on and rotated by driven shaft 208, and the rotary platen 204 is supported on rotating shaft 210. The rotary platen 204 is provided with a rubber blanket or sleeve 211, which supports the conveyor belt 16.

Figure 17:
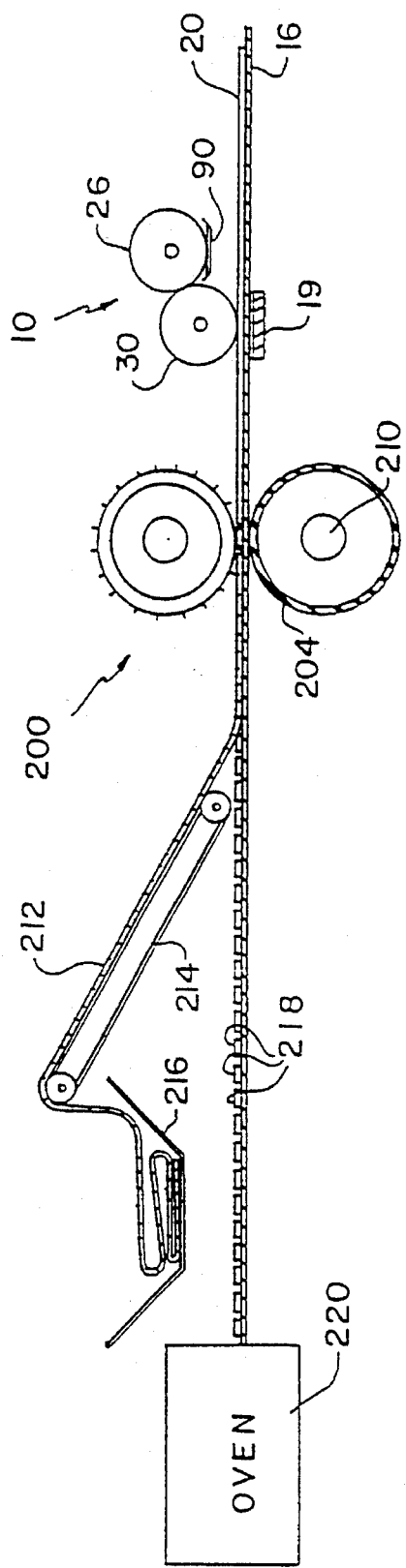
FIG. 17 is a schematic side view of the printing and cutting apparatus with the printer positioned upstream relative to the cutter.

The printing apparatus 10 is preferably positioned upstream relative to the cutting apparatus 200 with respect to the direction of the advancing dough sheet 20, as illustrated in FIG. 17. After the dough sheet 20 passes through the cutting apparatus 200, the forming dough waste portion 212 needs to be removed with a device such as an inclined conveyor 214 leading to a collecting bin 216. The individual dough pieces 218 remaining on the conveyor belt 16 can be transferred to an oven 220 for baking and then to a packaging station (not shown), or alternatively directly to a packaging station in the case of baked products.

Figure 18:
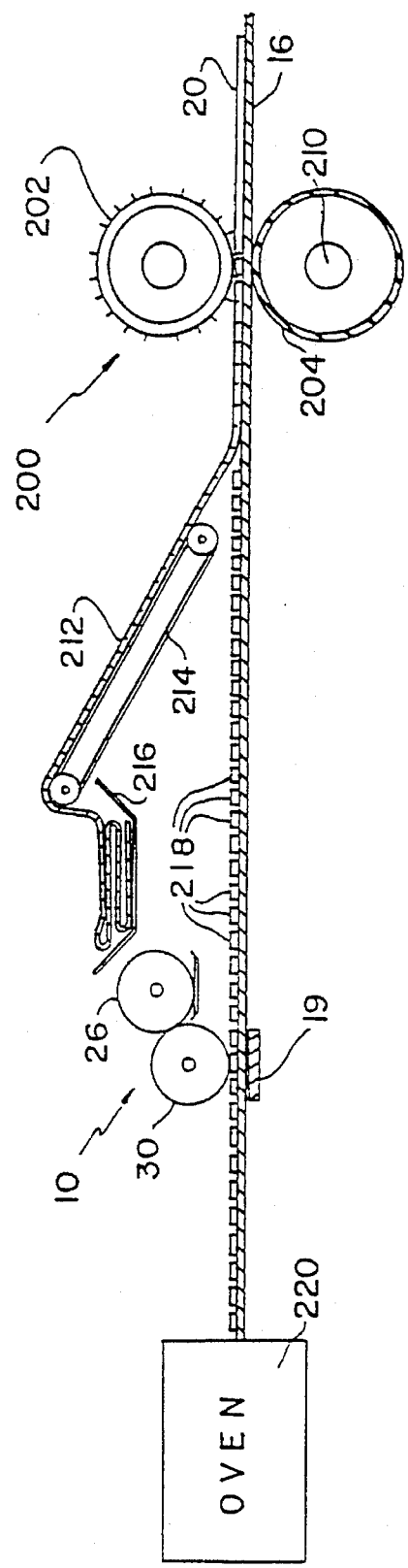
FIG. 18 is a schematic side view of an alternative embodiment of the printing and cutting apparatus with the cutter positioned upstream relative to the printer.

Another embodiment of the printing and cutting apparatus, is illustrated in FIG. 18, with the cutting apparatus 200 located upstream relative to the printing apparatus 10. In this embodiment, the waste dough portion 212 is lifted to remove it without substantial lateral or longitudinal displacement of the remaining dough so as to provide alignment and registration of the printed indicia with the cut dough pieces 218.

Synchronizing Drive

Figure 19:
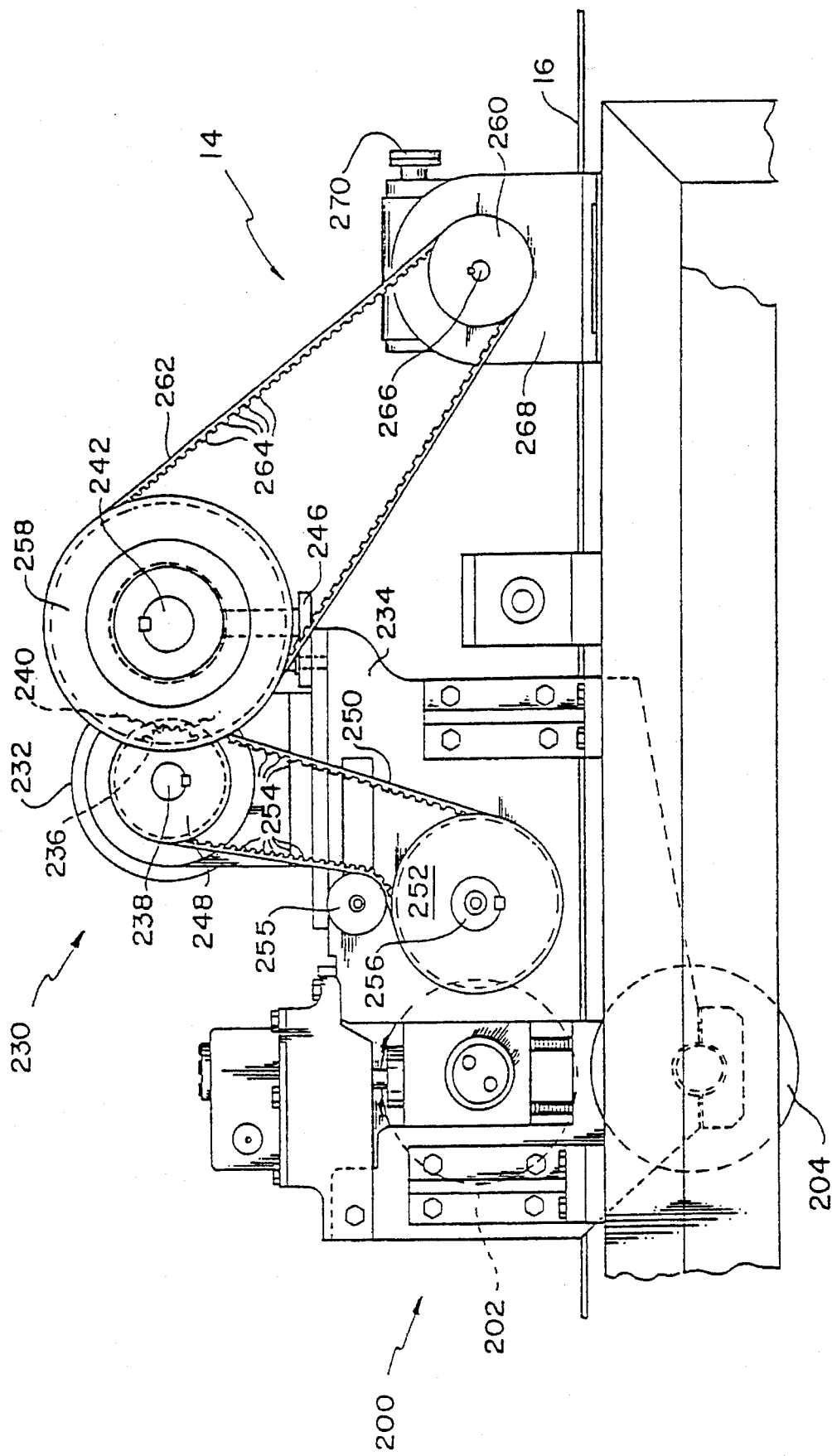
FIG. 19 is a detailed side elevational view of the printing and cutting apparatus with a synchronous drive.
Figure 20:
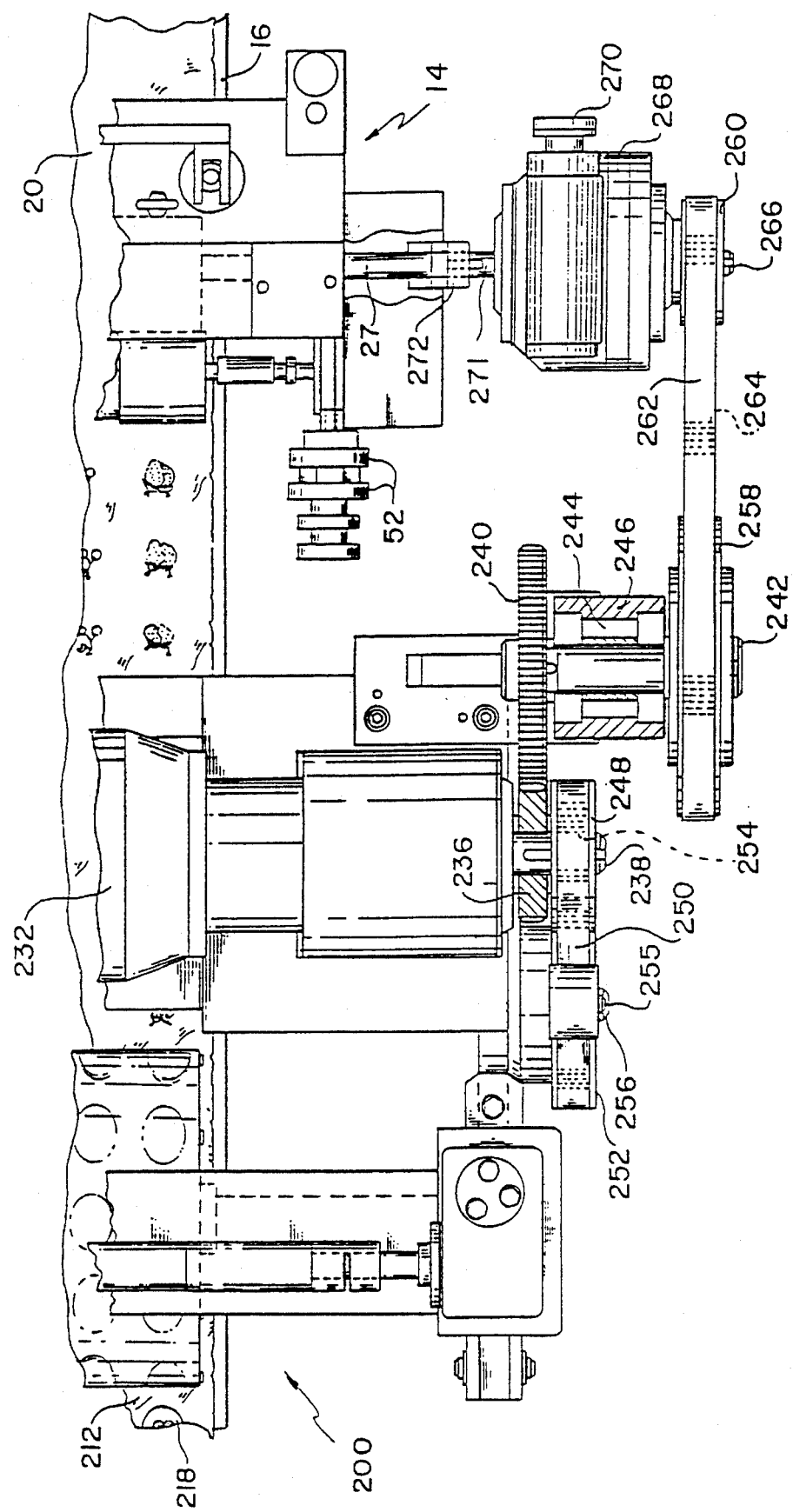
FIG. 20 is a detailed top view of the printing and cutting apparatus with a synchronous drive.

The printing apparatus 10 and rotary cutting apparatus 200, for example, shown in FIG. 16, must be driven synchronously to ensure proper registration of the printed matter on the advancing individual pieces 218 being cut from the dough sheet 20. Separate driving motors can be used for driving the printing apparatus and cutting apparatus, respectively, with a feedback control system for synchronizing the rotational speeds and relative rotational positions of the printer and rotary cutter. Further, other drive arrangements, using a common drive motor, for example, for the printing apparatus 10 and cutting apparatus 200 can be utilized for synchronizing the printing apparatus and the cutting apparatus. The synchronization may be achieved using mechanical connection or electronically. An embodiment utilizing a mechanically connected synchronizing drive with a common drive motor is shown in FIGS. 19 and 20 for achieving the desired synchronization between the printing apparatus 10 and cutting apparatus 200.

The synchronizing drive 230 comprises an electric motor 232 mounted on a support 234. A gear 236 is keyed on output shaft 238 of the electric motor 232. The gear 236 meshes with a gear 240 keyed to dummy shaft 242, which is rotatably mounted by bearing 244 on support 246, as shown in FIG. 20. The shaft 238 of the electric motor 232 is also provided with a cog pulley 248 for driving a synchronizing belt 250, which drivingly connects cog pulley 248 to cog pulley 252 of the cutting apparatus 200. The synchronizing belt is provided with a plurality of teeth 254 for cooperating with the teeth of cog pulleys 248 and 252. A belt tensioning device 255 is provided on the support 234 for maintaining the synchronizing belt 250 under proper operating tension. The pulley 252 is mounted on shaft 256 of the cutting apparatus 200. The shaft 256, through a gear drive (not shown), drives the drum 202 of the rotary cutting apparatus 200.

The shaft 242 is also provided with a cog pulley 258, which is drivingly connected to cog pulley 260 by synchronizing belt 262. The synchronizing belt 262 includes teeth 264, and is similar to the synchronizing belt 250. The pulley 260 is mounted on input shaft 266 of an infinitely variable differential drive 268. An infinitely variable differential drive which may be used is made by Candy Manufacturing Co., Inc., 626 Grove Street, Evanston, Ill. 60201, Dynamic Differential Model 5A, Rating 5HP at 1200 r.p.m., and is disclosed in U.S. Pat. No. 3,563,104, herein incorporated by reference in its entirety. The infinitely variable differential drive 268 shown in FIGS. 19 and 20 is provided with a knob 270 to advance or retard the printing roller. An output shaft 271 of the infinitely variable differential drive 268 is connected to the shaft 27 of the printer 14 by means of a coupling 272.

In embodiments (not shown) of the present invention using electronic synchronization of the printer 14 and the cutting apparatus, such as rotary cutter 200, separate drive motors are used for driving the cutter and the printer. An image detecting device or scanner, comprising a video camera or photoelectric eye for example, may be used to monitor the position of the substrate piece in relation to a predetermined position at a time when the printer roller is in a predetermined position. For example, a photoelectric eye may be used to detect the leading edge (in the longitudinal direction) of the piece upon which the printed indicia appears. The detected position may be compared electronically to a predetermined acceptable position for a given predetermined rotational position of the printer roller. If the measured position is unacceptable, electronic controls may be used to instantaneously or momentarily adjust the rotational speed of the cutter and/or printer (preferably the printer) to obtain a measured piece location within the acceptable predetermined range. The speed may be controlled or adjusted, for example, using an infinitely variable differential drive such as differential drive 268.

The image detecting or scanning device may be mounted immediately downstream of the point where the piece containing the indicia thereon is obtained. It may be mounted to continuously monitor pieces in any given longitudinal row. Monitoring of the end row pieces such as pieces 218 which are shown in FIG. 20 is preferred. Photoelectric eyes are preferred over systems using video cameras because they are much less costly.

In embodiments of the present invention where separate drive motors are used and the printer 14 and cutter 200 are synchronized electronically, the synchronizing belt 262, gears 236 and 240, dummy shaft 242, and cog pulley 258, for example, may be replaced by a motor which is connected to pulley 260 of the infinitely variable speed drive 268 via a pulley and belt arrangement.

In embodiments of the present invention where a common drive motor is used as in FIGS. 19 and 20, an image detecting or scanning device, and electronic comparing and controlling devices may be used to automatically and continuously monitor indicia registration and instantaneously or momentarily adjust the speed of rotation of the printer 14 via an infinitely variable differential drive 268 without the need for manual monitoring and manual adjustment via knob 270.

Image detecting or scanning devices and electronic comparing and controlling devices which may be used in the present invention are known. Exemplary of such equipment which may preferably be used is a registration system utilizing photoelectrics and digital speed controls sold by Wolock and Lott Transmission Equipment Corporation, North Branch, N.J. The registration systems comprises: 1) a photoelectric eye, such as Color Mark Scanner MCS 638A-1 produced by Warner Electric, Beloit, Wis., 2) a Wolock and Lott dedicated microprocessor, 3) an absolute encoder, such as one sold by Encoder Products Corp., 4) motor controls, such as fully regenerative DC drives equipped with pulse generators, sold by Emerson Industrial Controls, Grand Island, N.Y., 5) a digital command module, sold by Emerson Industrial Controls, and 6) a digital command module operator interface sold by Emerson Industrial Controls. The absolute encoder may be mounted on the same shaft as the printer roller for determining the relative position of indicia at a given time.

Cutting Apparatus

Figure 21:
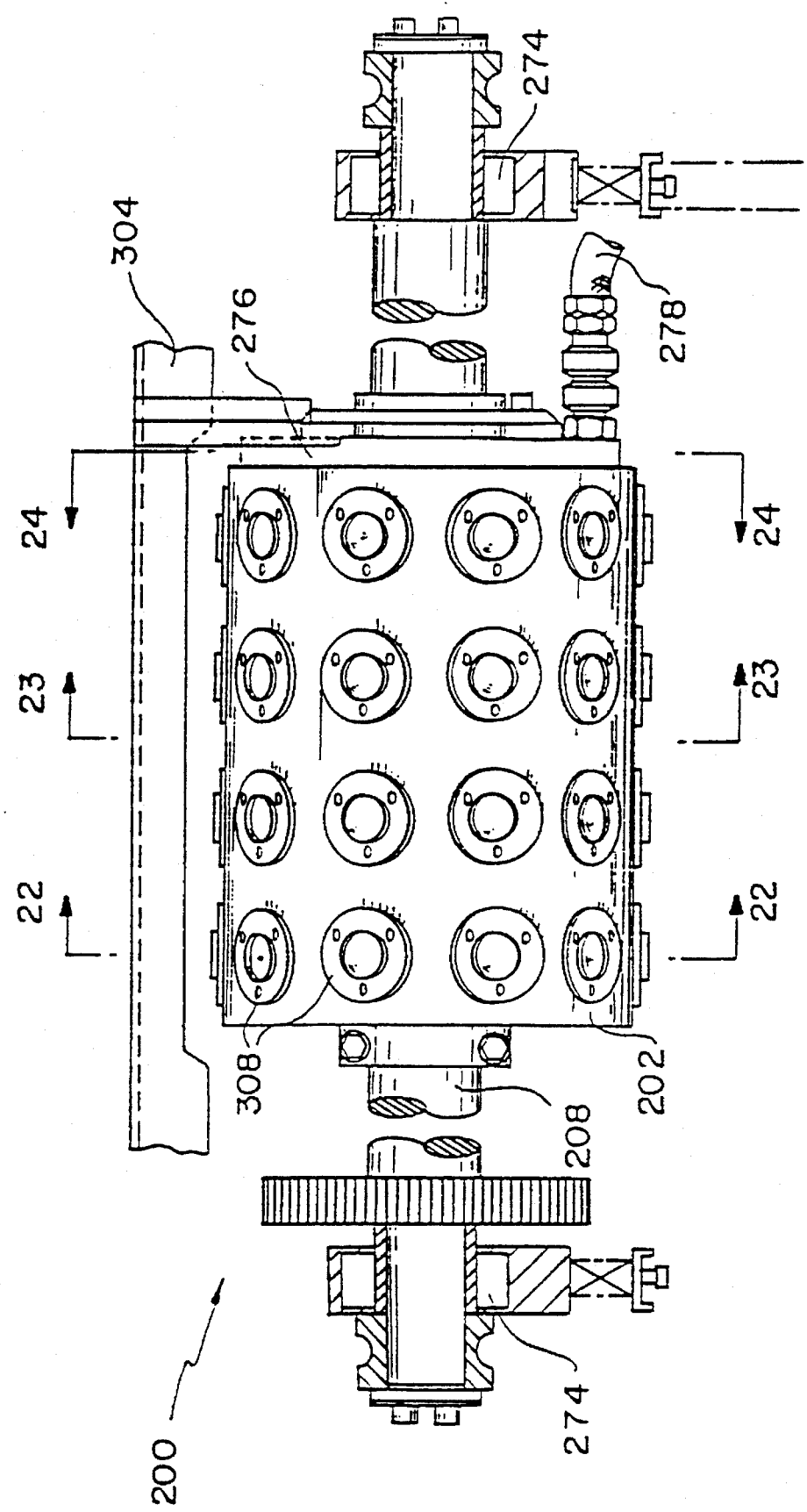
FIG. 21 is a detailed front elevational view of the cutting apparatus.
Figure 23:
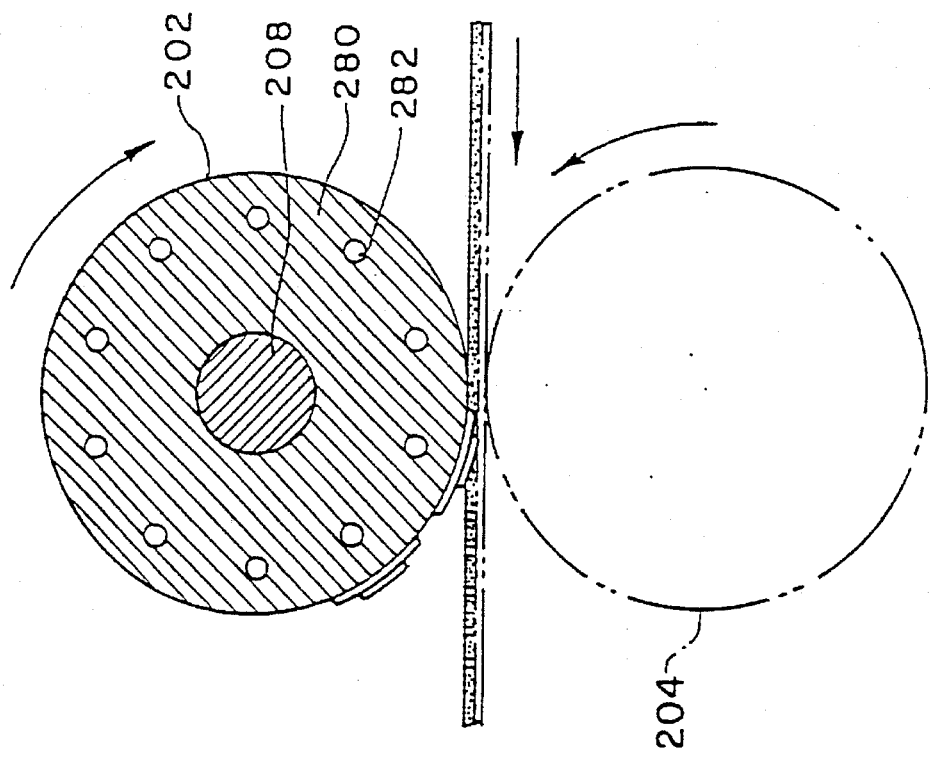
FIG. 23 is a side cross-sectional view of the cutting apparatus shown in FIG. 21, taken along the line 23—23.

The rotary cutting apparatus 200 comprises shaft 208 rotatably supporting drum 202, as shown in FIG. 21. The ends of the driven shaft 208 are supported by bearings 274 mounted adjustably in the vertical direction on the frame of the rotary cutting apparatus 200. At the righthand side of the drum 202, is mounted a stationary manifold plate 276 with an air supply hose 278 connected thereto.

Figure 22:
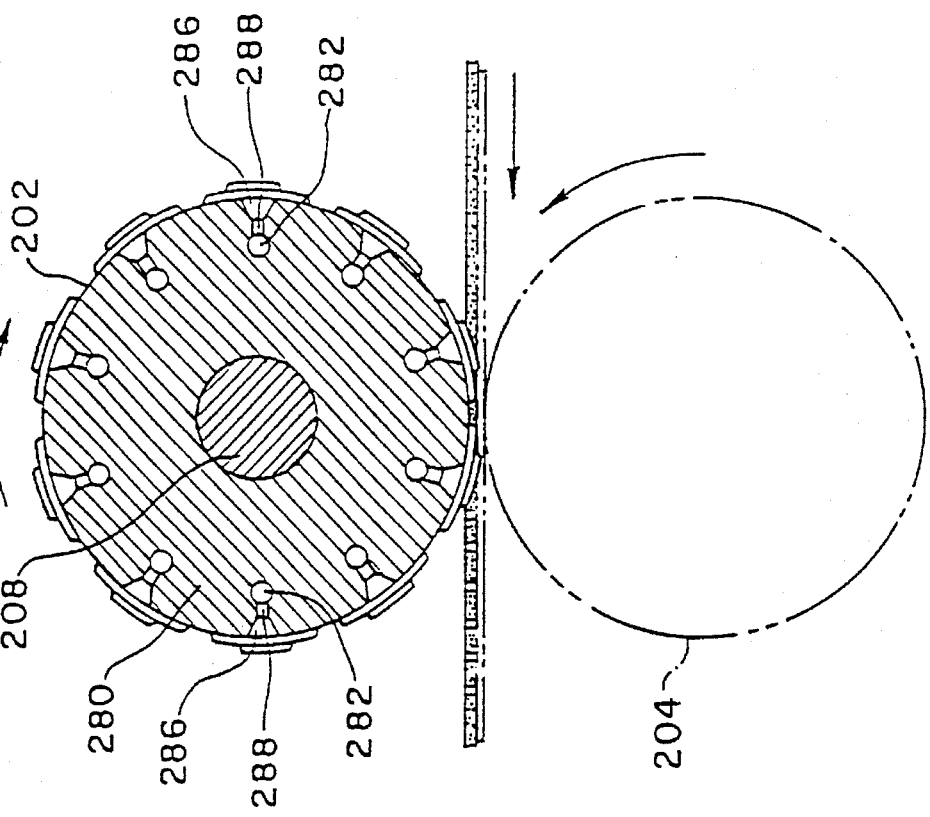
FIG. 22 is a side cross-sectional view of the cutting apparatus shown in FIG. 21, taken along line 22—22.

The drum 202 is constructed of a cylinder 280 having a plurality of air passageways 282 provided therein, as shown in FIG. 22. In another embodiment of the drum 202, the drum can be constructed of an outer cylinder which encompasses an inner cylinder as opposed to the single cylinder construction shown in FIG. 22.

The cylinder 280 is provided with a plurality of ports 286 fluidly connected to the air passageways 282 by radially extending air passageways 288. Further, the air passageways 282 extend traversely substantially the entire width of the cylinder 280, as shown in FIG. 25.

Figure 24:
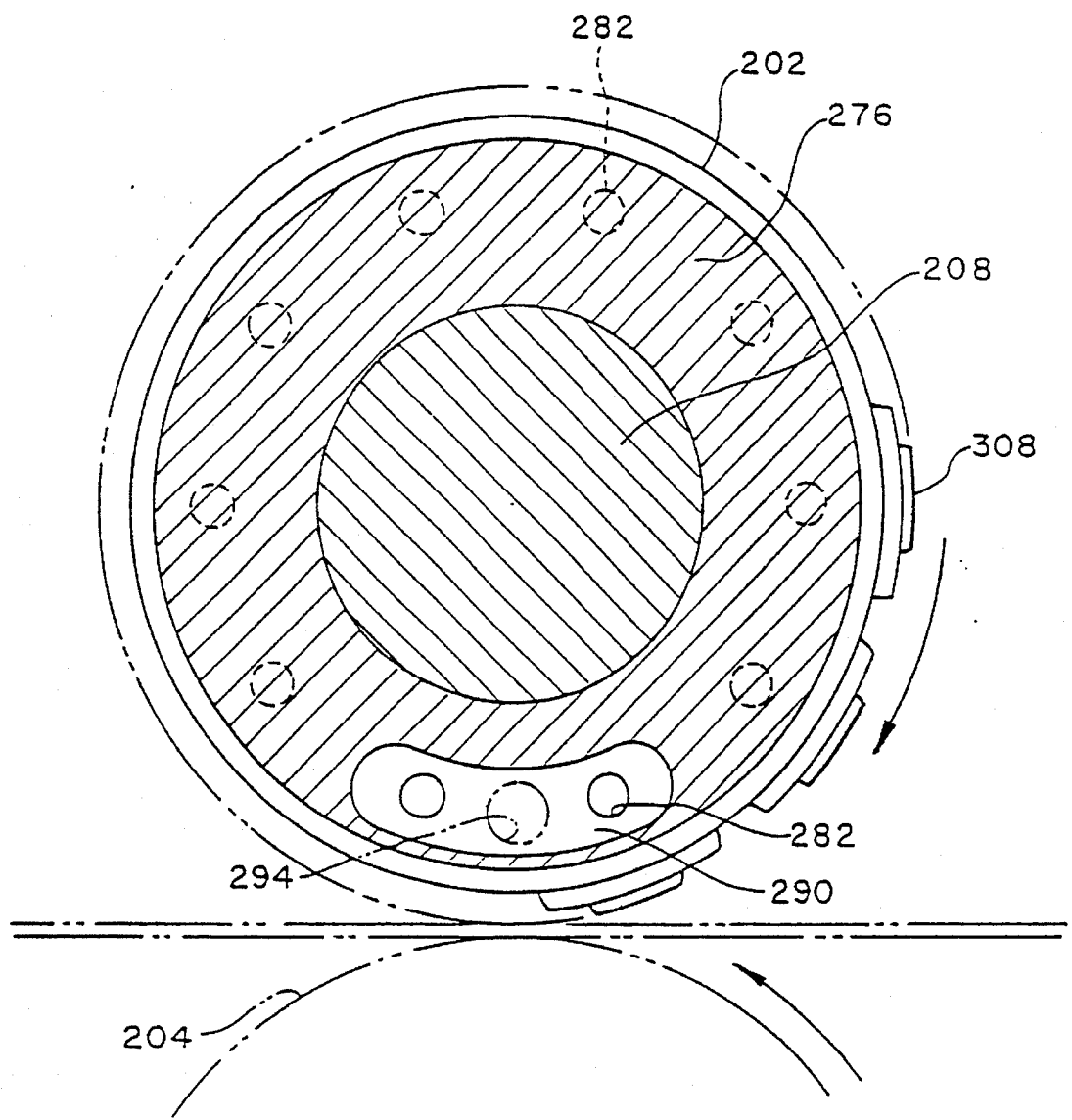
FIG. 24 is a side cross-sectional view of the cutting apparatus shown in FIG. 21, taken along line 24—24.

A cross section of the manifold plate 276, is shown in FIG. 24. The entrances to two of the air passageways 282 of the drum 202, which are presently located at the lower position of rotation of the drum 202 are shown registering with the air supply port 290 of the manifold plate 276, while the other entrances of the air passageways 282 remain covered or shut by the manifold plate 276. The registration of the entrances of the air passageways 282 with the air supply port 290 provides a temporary fluid connection between the air supply hose 278 and the registered air passageways 282. The air supply port 290 is connected to the air supply hose 278, through air passageway 294.

Figure 25:
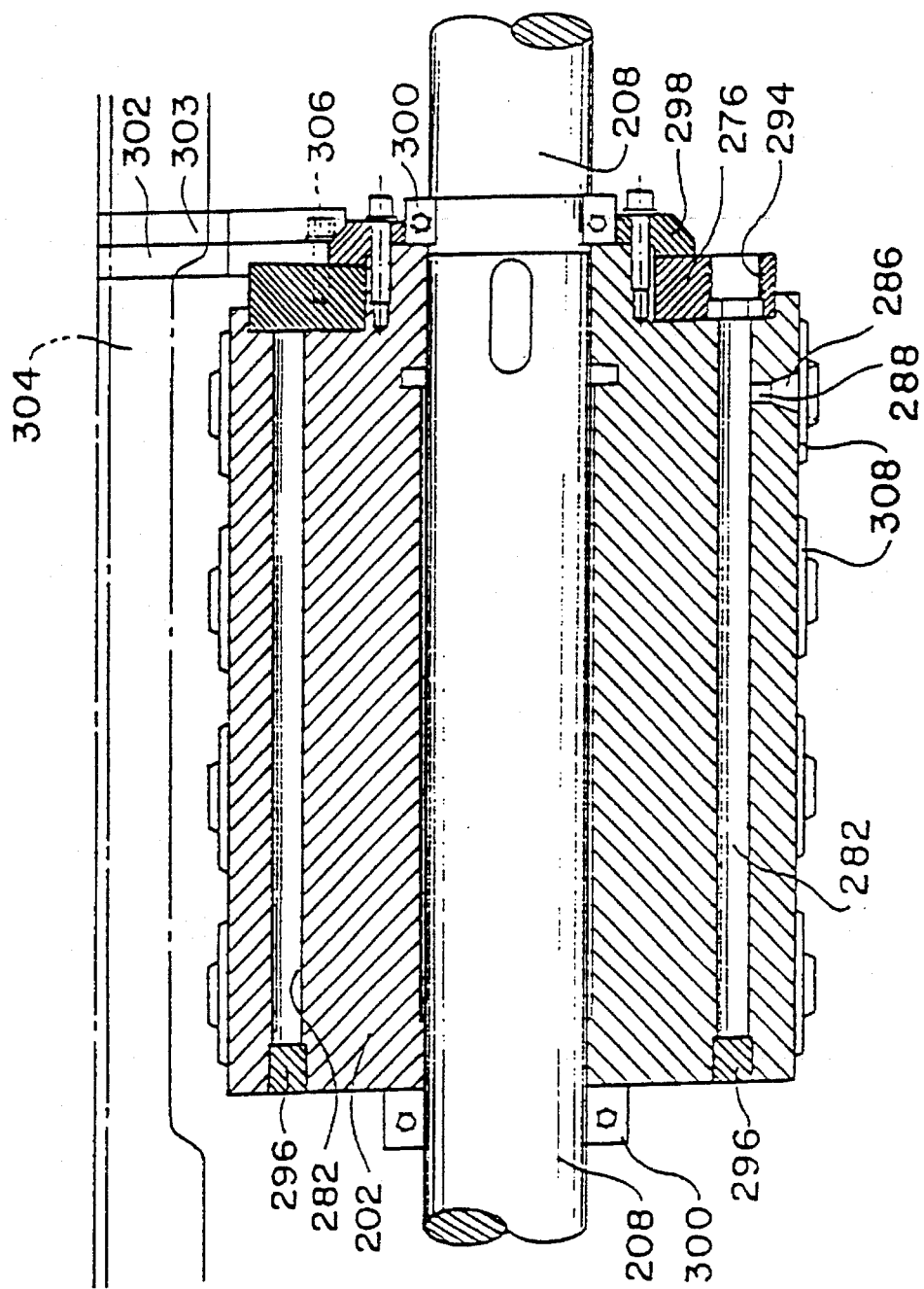
FIG. 25 is a transverse cross-sectional view of the cutting apparatus, shown in FIG. 21.
Figure 30:
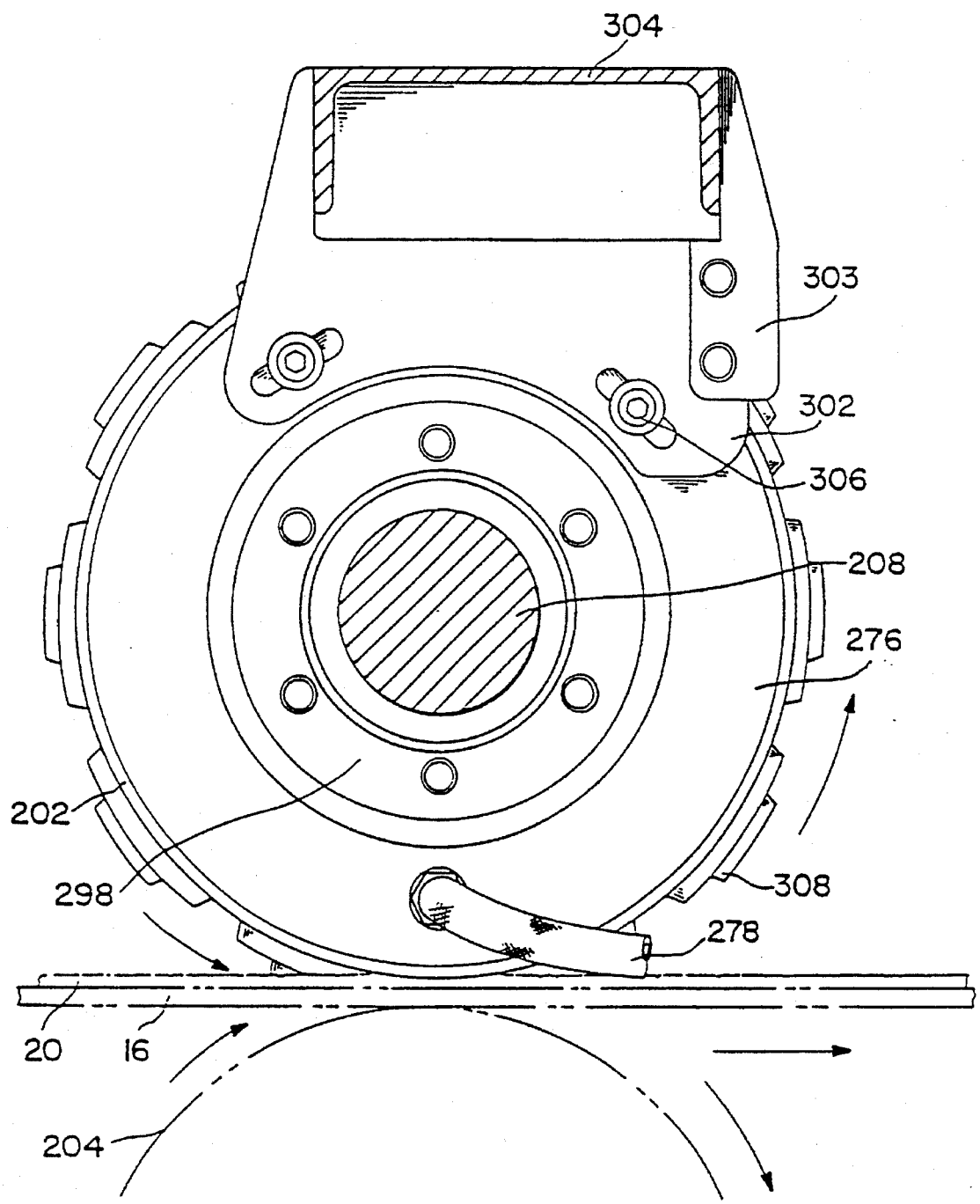
FIG. 30 is a side elevational view of the cutting apparatus, illustrating the air supply connection.

A detailed transverse cross sectional view of the drum 202, is shown in FIG. 25. The transverse air passageways 282 are shown as substantially extending along the full width of the drum 202. The lefthand ends of the air passageways 282 are provided with plugs 296 for sealing the downstream ends of the air passageways 282. The manifold plate 276 is retained in position on shaft 208 by sideplate 298 with the entire drum 202 held in position on shaft 208 by end clamps 300. The manifold plate 276 is held stationary by supports 302 and 303 connected to the frame 304 of the rotary cutting apparatus 200. The manifold plate 276 is connected by bolts 306 to supports 302 and 303, as shown in FIG. 30.

The periphery of the drum 202 is provided with a plurality of individual cutters 308 as shown in FIGS. 16, 21–25, and in more detail in FIGS. 26–29. The cutters 308 can be positioned in various arrangements around the periphery of the drum 202 depending upon the size and shape of the individual cutters. For example, round cutters for cutting round crackers or cookies can be spaced in transverse rows and circumferential rings. The cutters 308 can be attached to the drum 202 by various means such as screws 310, as shown in FIG. 26. The cutters shown in FIG. 27 each include a base portion 312 with a cutting edge 314 extending therefrom. A cavity 316 is provided in the space between the cutting edges with a plurality of air supply holes 318 extending through the base portion 312 into the cavity 316. The air supply holes 318 register with the ports 286 of the drum 202.

Operation of the Printing and Cutting Apparatus

Preparation for operation of the printing apparatus 10 begins with filling the ink tray 90 of the printer 14 with an ample supply of ink. The ink can be delivered batchwise to the ink tray 90 or can be delivered continuously from the ink supply comprising the reservoir 114 supplying ink via the supply line 120 to the ink tray 90, as shown in FIG. 10. The viscosity controller 118 is operated so as to sense the viscosity of the ink within the ink reservoir 114, and add additional ink solvent contained in the reservoir 121 to the ink reservoir as needed to maintain a set viscosity of the ink. Thus, a feedback system for adding periodic quantities of additional ink solvent is provided during operation of the printer.

Snack foods such as cookies, crackers, etc. to be printed on can be placed on the conveyor belt 16 of the belt conveyor 12. If individual pieces are to be printed upon, the individual pieces must be placed on the conveyor belt 16 in a specific arrangement to ensure proper registration with the printer 14.

However, preferably a continuous dough sheet 20, from raw to fully cooked, can be placed on the conveyor 16 to be printed upon. The conveyor belt 16 advances the dough sheet 20 to the printer. One advantage of utilizing a dough sheet, allows the feeding of the food material to the printer 14 without the need for arranging individual pieces on the conveyor to ensure proper registration. The dough sheet 20 is simply advanced by the conveyor 16 to the printer, and is printed upon at various positions based on the location of the indicia markings on the inking roller 26, which are offset onto the printing roller 30 and then onto the dough sheet 20.

The actual inking operation begins by initially raising the inking tray 90 to a position at which the inking roller 26 engages with the ink contained therein, as shown in FIG. 8. Preferably, the printing roller 30 is positioned out of engagement with the inking roller 26, and the printing roller 30 is positioned out of contact with the dough sheet 20. If the printing roller 30 is placed in contact with the inking roller 26 while the printing roller 30 is positioned out of printing contact with the dough sheet 20, repeated patterns or images of ink will be repeatedly offset onto the printing roller 30, without removal of the ink from the printing roller 30 by the dough sheet 20, creating excess ink and ghost images on the offset printing roller 30. Thus, typically the inking roller 26 will not be placed into engagement with the printing roller 30 until after the printing roller 30 is positioned in printing contact with the dough sheet 20.

Once the inking roller 26 is placed in the ink contained in the ink tray 90, the surface of the inking roller 26 picks up a film of ink on the periphery thereof. Excess ink adhered to the surface of the inking roller 26 is removed by the doctoring device to the extent that ink only remains in the indicia or design engraving cavities at or below the surface of the inking roller 26. The inking roller 26 can continue to rotate through the ink tray in a standby position repeatedly, without a build-up of ink on the surface thereof due to the doctoring device.

The ink tray 90 is raised from a lowered non-inking position, as shown in FIG. 9, by rotating the handle 102 of the toggle mechanism 98, as shown in FIGS. 10–12. By rotating the handle from the non-inking position, as shown in FIG. 12, upwardly to the position shown in FIG. 11, the support rods 96 are raised as can be seen by comparing the reference mark 108 in these two figures, thus raising the ink tray 90.

After the inking roller 26 is properly being inked from the inking tray 90, the interrupter between the printing roller 30 and the workpiece or dough sheet 20 is operated to place the printing roller 30 in contact with the dough sheet 20. Operation of this interrupter is controlled by control valve 162, which operates the air cylinders 34. When the air cylinders 34 are initially operated, the pistons of the air cylinders 34 retract and raise the upper end of the arms 24, as shown in FIG. 2, causing the support arms 24 at the opposite ends to rotate downwardly placing the printing roller 30 in contact with the dough sheet 20. As the dough sheet 20 is advanced underneath the printer roller 30 in the standby position, no ink is transferred therefrom.

Offset printing of the dough sheet 20 can now begin by operating the interrupter between the inking roller 26 and printing roller 30. Operation of this interrupter is initiated by operating controller 160, as shown in FIG. 15, which controls the supply of air to air cylinders 52. The air cylinders 52 are operated so as to extend the piston rods 54 moving the bearings 32, which are slidably supported on the lower ends of the support arms 24, as shown in FIG. 3. As the rods 54 are extended, the beatings 32 and thus the printing roller 30 are slid causing peripheral contact of the printing roller 30 with the inking roller 26. Once the printing roller 30 has peripherally engaged with the inking roller 26, the printing operation begins.

The printing pressure between the printing roller 30 and the dough sheet 20 can be adjusted by rotating adjusting nuts 38 acting as stops for the support arms 24, as shown in FIG. 2. By rotating the adjusting nuts 38 upwardly, a greater amount of printing pressure is provided by allowing the upper ends of the support arms 24 to rotate to a higher position allowing the air cylinders 34 to further increase the pressure exerted by the printing roller 30 onto the dough sheet 20.

The pressure between the printing roller 30 and the inking roller 26 can be adjusted by adjusting the positioning of the adjusting nuts 58 of the air cylinders 52, as shown in FIG. 3. Adjustment initially begins by rotating the locking nuts 60, to positions that allow the adjusting nuts 58 to rotate freely on the screw portions 56 of the piston rods 54 of the air cylinder 52. Once the positioning of the nuts 58 is adjusted, the locking nuts 60 are then rotated to engage with the adjusting nuts 58 and lock the same in position.

The doctoring operation of the inking roller 26 can be adjusted by changing the positioning of the doctor blade sections 124 with respect to the surface of the inking roller 26. Further, the mount of pressure exerted by the thin steel blades 134 onto the surfaces of the inking roller 26 can be adjusted. Adjustment of each doctor blade section 124 begins by loosening the bolts 147 holding the clamps 146, as shown in FIG. 14. Once the bolts 147 have been loosened, the adjusting screws 144 can be rotated to adjust the positioning and pressure of the thin steel blades 134 with the surface of the inking roller 26. After this adjustment, the bolts 147 are retightened to securely lock each doctor blade section 124 in position.

Both the printing roller 26 and inking roller 30 can be removed from the printing apparatus 10, after the printing operation, for clean up purposes. Removal begins by loosening allen head screws 88 of the couplings 78, as shown in FIG. 6. Once the couplings 78 have been loosened, they can be slid to a position, as shown in FIG. 7, to allow the roller to be lifted from each saddle portion 80. Installation of the rollers occurs by reversing the sequence described above.

In the combined printing and cutting apparatus, as shown in FIG. 16, the printing apparatus 10 and the cutting apparatus 200 are operated simultaneously. The cutting apparatus 200 can be provided with an interrupter for separating the drum 202 having a plurality of cutters 308 from the advancing dough sheet 20. Operation of the combined printing and cutting apparatus begins by operating the conveyor belt 16 to advance the dough sheet 20 under the printing apparatus 10 and cutting apparatus 200 and then sequentially bringing the printing apparatus and then the cutting apparatus into contact with the dough sheet.

The operation of the cutting apparatus 200 begins by rotating the drum 202 with the individual cutters 308 making contact with the dough sheet 20. As the drum 202 rotates, the individual cutters 308 cut the dough sheet into a plurality of individual dough pieces 218, as shown in FIG. 16. Then, the printing apparatus 10 is operated by following the above-described sequence of events to begin operation of the printing apparatus 10. Once a steady state operation of the printing apparatus 10 and the cutting apparatus 200 is achieved, adjustment can be made so as to properly register the indicia or design printed on the dough sheet 20 by the printing apparatus 10 with the cutting operation by cutting apparatus 200. This can be achieved by adjusting the infinitely variable differential drive 268 by rotating the knob 270, as shown in FIG. 19, to advance or retard the printing roller. Thus, the printing apparatus 10 is adjusted until the printing and cutting operations are properly registered in the longitudinal or machine direction. Registration in the transverse or lateral direction is achieved by spacing the cutters 308 and the engraved portions on the inking rollers so that they align in the lateral direction. Lateral adjustments may be made, for example, using spacing rollers and/or by means for lateral movement of the shafts 27, 31 and rollers 26 and 30.

During operation of the cutting apparatus 200, a supply of pressurized air is connected to the air supply hose 278, as shown in FIG. 21. The air supplied through air supply hose 278 enters the air supply port 290 of the manifold plate 276, as shown in FIG. 24. As the entrances to the air passageways 282 of the drum 202 register with the air supply port 290 at a lower position of rotation of the drum 202, these air passageways are temporarily supplied with pressurized air for a fixed increment of rotation set by the segment length of the air supply port 290. The pressurized air received within the air passageways 282, when positioned at the lower position of rotation of the drum 202, is fed to the radial air passageways 288, and then to the ports 286 located at the peripheral surface of the drum 202, as shown in FIG. 25. The pressurized air supply to the ports 286 is then fed through the air supply holes 318 of the individual cutters 308 to pressurize the cavities 316 closed off by the individual dough pieces being cut.

During the cutting operation, which occurs generally at the lower position of rotation of the rotating drum 202, the dough sheet 20 is cut into individual dough pieces 218 that at least partially enter the cavities 316 of the cutters 308 located generally at the lower position of rotation of the rotating drum 202. The pressure built up within these particular cavities 316, prevent the individual dough pieces 218 from penetrating too deeply into the cavities 316, and then blows out the individual dough pieces 218 while maintaining them substantially in contact with the moving conveyor belt 16. Without air pressure supplied to the cavities 316 of the individual cutters 308, the individual cutters 308, would tend to lift the individual dough pieces being cut from the advancing dough sheet creating a separation problem between the waste dough sheet portion and the individual dough pieces, at a downstream location and/or clogging up of the cutters. Further, pressurizing the cavities 316 facilitates accurate registration of the printed material centered within the dimensions of the individual dough pieces by preventing a portion of the dough sheet 20, located at any given moment between the printing apparatus 10 and the cutting apparatus 200, from being stretched or compressed causing a change in its dimensional characteristics.

Printing and Molding Apparatus

Figure 31:
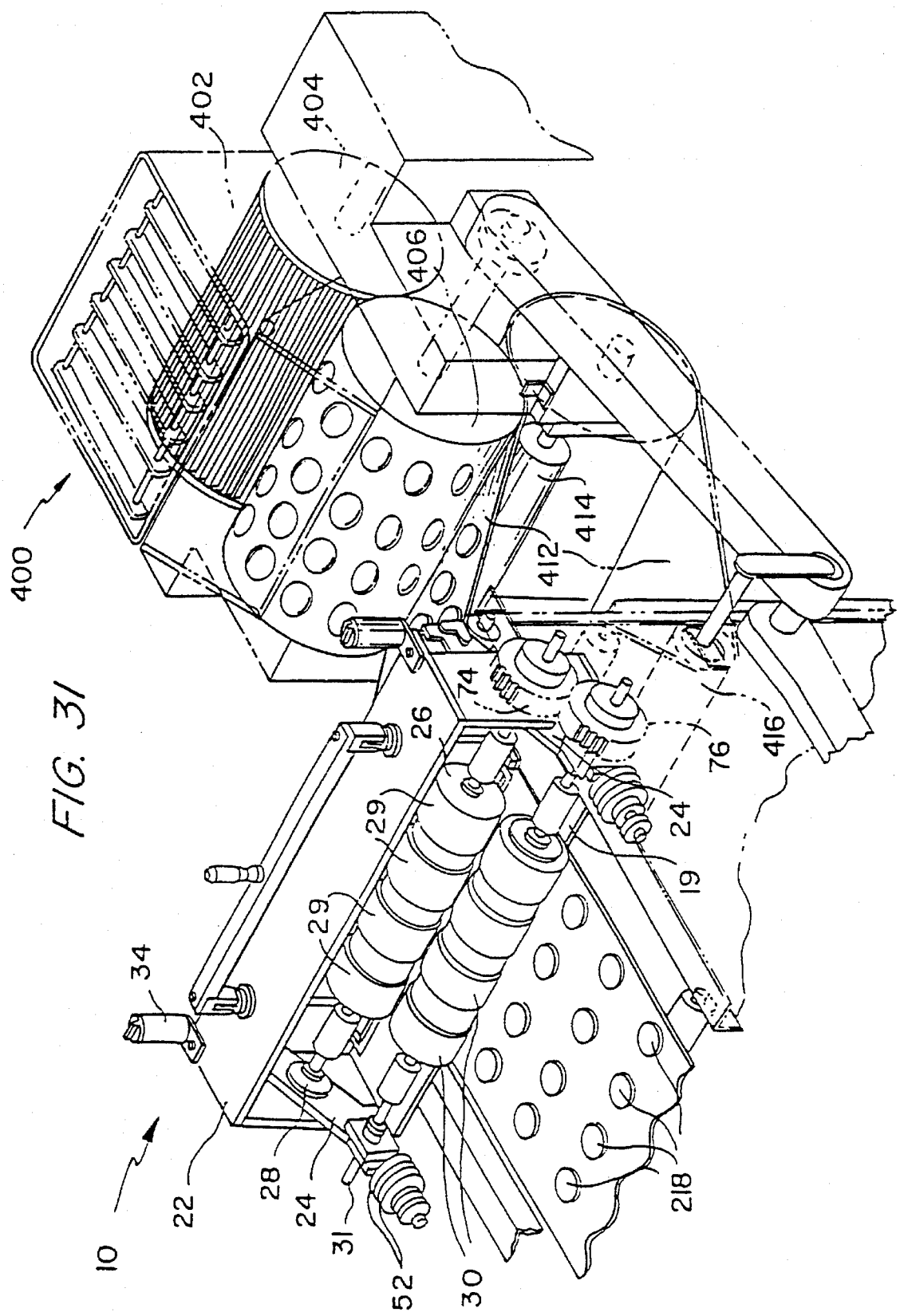
FIG. 31 is a perspective view of the combined printing and rotary molding apparatus according to the present invention.

An embodiment of the combined printing and rotary molding apparatus according to the present invention is shown in FIG. 31. The printing apparatus 10 described above can be utilized with a rotary molding apparatus 400 of the type described in detail below. However, other printers or rotary molders can be substituted in the combined apparatus. Commercially available rotary molders may be used in the combined apparatus of the present invention, such as those produced by Weidenmuller Co., Morton Grove, Ill.

The rotary molding apparatus 400 comprises a hopper 402 situated above a rotating feeding drum 404. The rotating feeding drum 404 can be corrugated or provided with a plurality of peripheral transverse fibs as shown in the side view in FIG. 32 for feeding purposes. The rotating feed drum 404 is mounted on bearings supported on a frame (not shown). Positioned adjacent to and in peripheral contact with the rotating feeding drum 404, is a rotary molding drum 406. The rotary molding drum 406 is provided with a plurality of molding cavities 408 positioned in a particular arrangement about the peripheral surface of the rotary molding drum 406. The rotary molding drum 406 is rotatably mounted on bearings supported by the frame (not shown). Positioned beneath the rotary molding drum (406) is a pressing drum 410. The pressing drum 410 is mounted on bearings supported on the frame (not shown).

Figure 32:
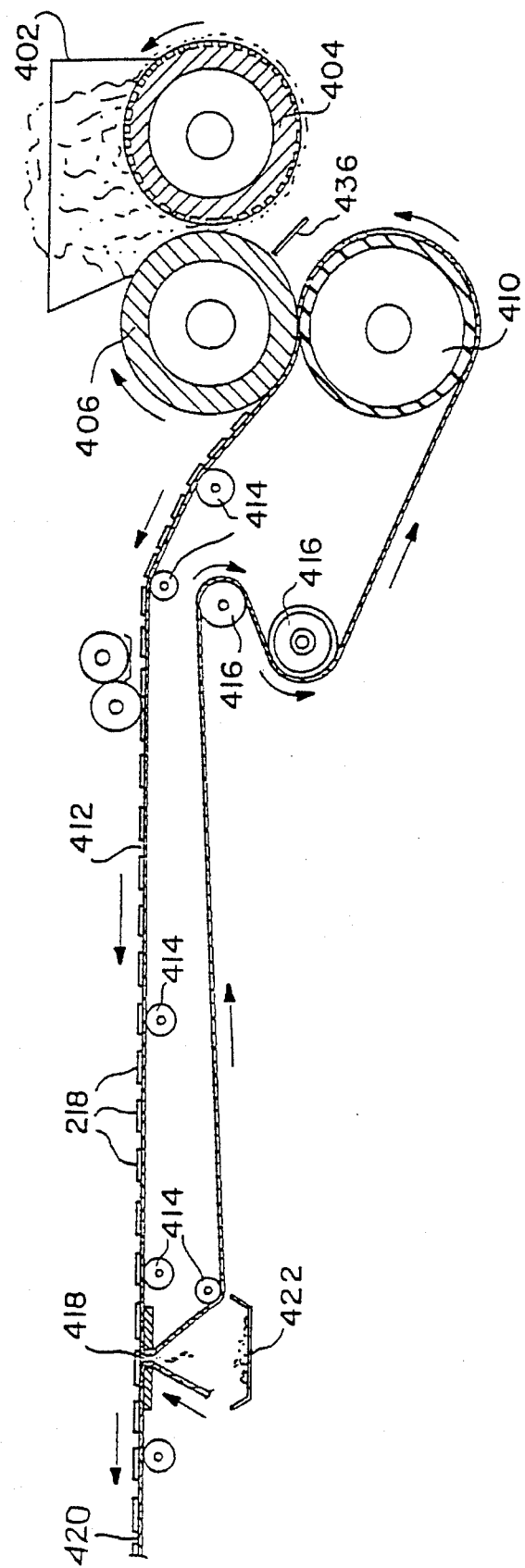
FIG. 32 is a schematic side view of the combined printing and rotary molding apparatus as shown in FIG. 31.

A continuous web conveyor 412 is supported on a plurality of guide rollers 414 and fed between the rotary molding drum 406 and the pressing drum 410, as shown in FIG. 32. The continuous web conveyor 412 is made of a fabric-type composite material with which the individual dough pieces 218 being formed preferentially adhere verses the inner surfaces of the molding cavities 408 in order to remove the individual pieces therefrom. The individual dough pieces 218 must effectively adhere to the continuous web conveyor 412 in order to maintain the alignment of the individual pieces for registration purposes with the printer 10. The drums of the rotary molding apparatus 400 and the continuous web conveyor 412 are driven by conventional drives known in the art.

As shown in FIG. 32, the combined printing and rotary molding apparatus includes a tensioning device comprising tensioning rollers 416. Further, the continuous web conveyor 412 is fed over a blade 418 for discharging the individual dough pieces 218 onto another conveyor 420, typically leading to a baking oven. The apparatus also includes a tray 422 for receiving waste tail portions of the individual dough pieces 218 which are formed during the rotary molding process and sheared therefrom during the transfer from the one conveyor to the other.

Figure 33:
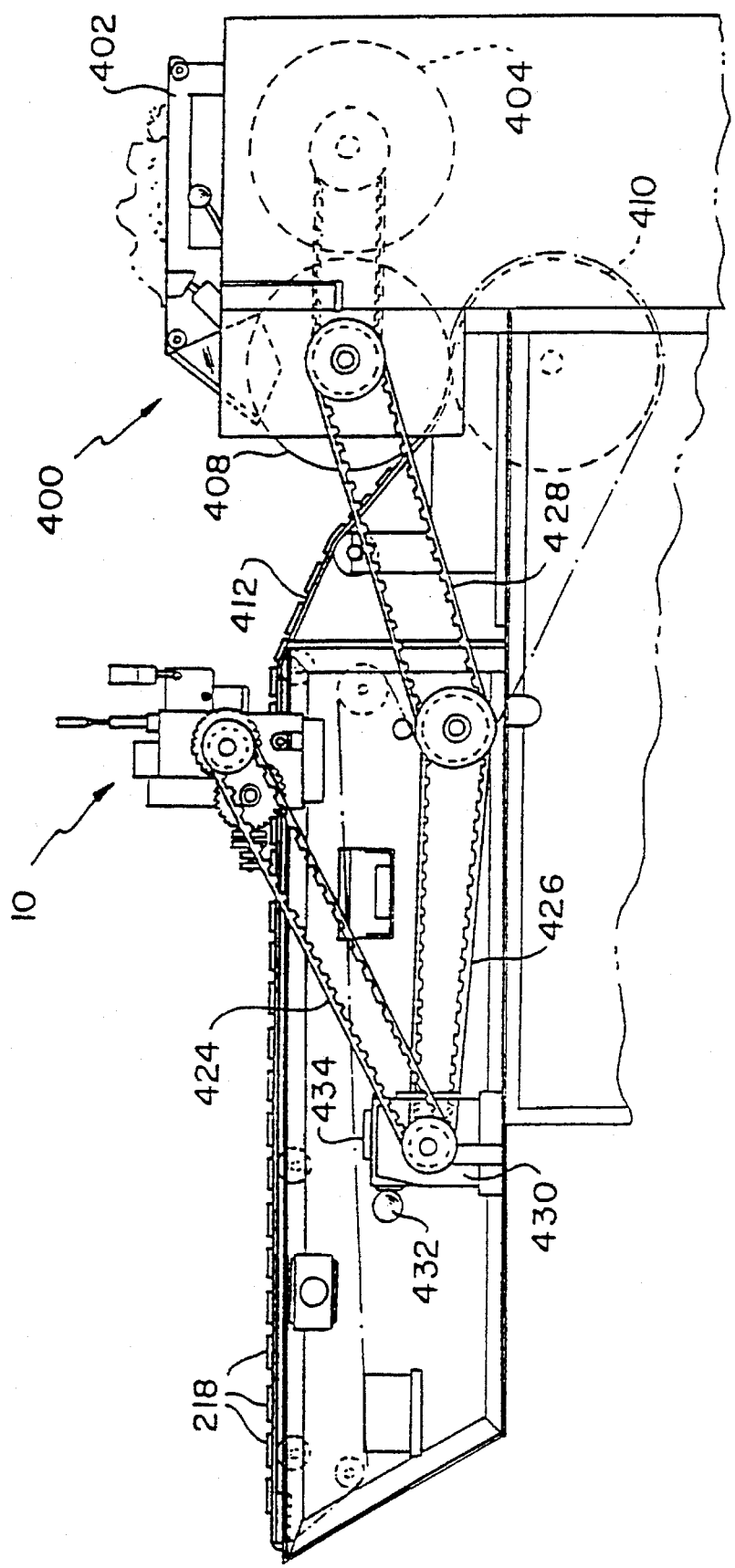
FIG. 33 is a detailed side view of the combined printing and rotary molding apparatus as shown in FIG. 31.

The combined printing and rotary molding apparatus is provided with a synchronous drive for driving the printing apparatus 10 and rotary molding apparatus 400 in synchronization. As shown in FIG. 33, the drive comprises a drive motor (not shown), a plurality of synchronizing belts 424, 426, 428 interconnecting the printing apparatus 10 and rotary molding apparatus 400. An infinitely variable differential drive 430 is provided between pulleys cooperating with synchronizing belts 424 and 426. The infinitely variable speed drive 430 is provided with a knob 432 for adjusting the input and output ratio of the infinitely variable drive 430, which can be viewed on the dial indicator 434.

Operation of the Printing and Molding Apparatus

Operation of the combined printing and rotary molding apparatus beans with the addition of snack food dough into the hopper 402, as shown in FIG. 33. The dough is fed into the molding cavities 408 of the rotary molding drum 406 by the rotating feeding drum 404. A wiper or scraper blade 436, as shown in FIG. 32, removes any excess dough material extending above the molding cavities 408. The individual dough pieces formed in the molding cavities 408 are transferred into the nip between the rotary molding drum 406 and pressing drum 410 to enable transferring and adhesion of the dough pieces to the continuous web conveyor 412.

The individual dough pieces 218 are transferred from the rotary molding apparatus 400 to the printing apparatus 10 in the particular arrangement dictated by the spatial arrangement of the molding cavities 408 on the peripheral surface of the rotary molding drum 406. The individual dough pieces 218 must sufficiently adhere to the continuous web conveyor 412 in order to ensure no relevant movement therebetween for proper alignment and registration with the printing apparatus 10. The individual pieces are transferred on the continuous web conveyor 412 so as to pass between the platen and printing roller of the printing apparatus for carrying out the printing operation. The individual printed dough pieces are subsequently transferred to an exit point of the continuous web conveyor 412 where they are typically transferred to another conveyor of a baking oven.

The operation begins with an initial start-up period during which registration of the individual dough pieces formed by the rotary molding apparatus 400 are registered with the printing roller in the longitudinal or machine direction by adjusting the infinitely variable differential drive 430 by rotating knob 432. Once steady state is achieved, printing registration is maintained over substantially long periods of time with little or no further adjustment required for each batch of dough.

Electronic synchronization of the printing apparatus 10 and rotary molding apparatus 400 may also be achieved with a registration system utilizing photoelectrics and digital speed controls as described above for the combined printing and cutting apparatus. A common drive motor, or preferably separate drive motors, for the printer and rotary molder may be used. For example, the photoelectric eye may be mounted immediately downstream of the printing roller for monitoring alignment of the printed image on the rotary molded pieces 218 of an end row. The synchronizing belt 426, for example, may be replaced by a motor which is connected to the variable speed drive 430 via a pulley and belt arrangement.

Method of Providing Printed Indicia on Baked Goods

Printing on cookies, crackers and other snack foods according to the present invention involves preparing a farinaceous based dough, such as by mixing cracker or cookie ingredients together, and forming the dough into a sheet or individual pieces in a conventional manner. The dough may then subsequently be printed on preferably by the printing apparatus 10 described above specifically developed for high speed printing on a dough sheet. The dough sheet or dough pieces at the time of printing may be raw, but could be partially or even fully cooked.

The dough sheet may be formed, for example by rotary or reciprocating cutting, into individual dough pieces either prior to or after the printing operation. Cutting of a dough sheet on a conveyor such as a belt conveyor is preferable, provided the dough is sheetable, so as to facilitate alignment for printing and cutting registration. When printing on an uncut sheet or on a sheet which is at least partially cut through its thickness, it is not necessary to align individual pieces of dough on the conveying device in a manner so that they properly register with the printer.

Maintaining the dough in a continuous uncut sheet while printing is generally advantageous for maintaining alignment as compared with an operation involving cutting or molding prior to printing. The cutting or molding operation prior to printing may dislodge or misalign the individual dough pieces on the conveying device resulting in improper registration with the printer. However, precut individual dough pieces generally maintain alignment due to the dough of the individual pieces sticking or adhering to the conveying device during and after the cutting operation and prior to the printing operation. It is generally preferred to form pieces and to print on them using a single conveyor rather than transferring pieces to another conveyor for printing.

Generally, cracker doughs and several cookie doughs possess the theological properties or consistency needed for forming a dough sheet. However, many doughs, such as many cookie doughs are not sheetable on a continuous mass production basis. Generally, cookie doughs are preferably rotary molded into individual pieces and then printed upon using the printing apparatus of the present invention. Cookie doughs may also be formed into pieces using conventional wire cutting apparatus, but generally this method does not form rows and columns of pieces as well aligned as does rotary molding. Alignment of dough pieces or baked goods for printing may be achieved using known alignment devices, such as gates and channels.

In embodiments of the present invention, the pieces may be enrobed by an oleaginous-based coating composition such as white or dark chocolate or compound coating either before or even after printing. The cookies which may be provided with printed indicia include crisp, soft, multi-textured, filled and sandwich varieties. The crackers which may be provided with printed indicia include fermented or sponge goods types, and chemically leavened varieties. The doughs may be laminated into sheets in a conventional manner. Snacks which may be provided with printing include farinaceous-based, chip or chip-like products, puffed or expanded extruded snacks, or half-products.

The printer of the present invention is well suited for high speed printing on a dough sheet or individual dough pieces without any excess ink marring the finished products or contaminating any waste dough resulting from the cutting operation, which waste dough is typically recycled immediately to form a new dough sheet for processing.

In the method of the present invention a rotary offset printing technique is used. An inking roller having one or more engraved indicia or designs transfers an ink indicia or design to an offset roller, which in turn subsequently transfers the ink to a dough sheet or individual dough pieces. The offset roller is preferably constructed with silicone rubber and provides almost complete transfer during the offsetting step to the dough sheet or individual pieces, to provide a very clean and accurate transfer. Further, the silicone cylinder is resilient, and can accommodate most surface deformations or irregularities of the substrate without deforming the substrate.

In embodiments of the present invention, multicolored designs or indicia can be created on a substrate by using a plurality of printers 14 synchronized with each other and with either a cutting apparatus 200 or rotary molding apparatus 400. For example, the apparatus of FIG. 16 may be modified to include two or three additional printers 14 arranged serially upstream of the printing apparatus 10 and cutting apparatus 200. The apparatus of FIG. 31 may be modified to include two or three additional printers 14 arranged serially downstream of the printing apparatus 10 and rotary molding apparatus 400. In these multicolor printing embodiments each of the three or four printers 14 would serially apply or transfer a different colored ink to the substrate. The different colored inks may be applied to different portions of the substrate and/or to the same portions of the substrate. Applying the different colors to the same portion results in the production of a new color. The three different colored inks may, for example, be the three additive primary colors (red, green and blue) or the three subtractive primary colors (red, yellow and blue) which upon mixing produce other hues. A fourth color may be black for printing an outline which is filled in by the other colors or hues.

When the printing is performed upon raw or partially baked doughs, subsequent baking may be performed at conventional baking temperatures of about 250° F. to about 600° F., for example.

The present invention is further illustrated by the following examples:

EXAMPLE 1

This Example illustrates the production of a printed, unfermented or chemically leavened type cracker by printing on a cracker dough sheet followed by cutting of the printed sheet using a printing and cutting apparatus as shown in FIG. 16.

The process began by operating an ink supply to fill the ink tray of the printer. A ¼ horsepower ink pump made by Graymills Corporation, Chicago, Ill. 60613, was utilized for pumping the ink to the ink tray. The ink pump was combined with an electric motor made by Reliance Electric Company, Cleveland, Ohio 44117 to form a combined unit known as Gray-Mills Superflo, Model No. HR18-04KE. An ink viscosity controller known as Color Control-holland, "Standard Viscosity Controller", Type 5LAO, 110 V, 60 Hz was operated for the addition of ethyl alcohol to an ink reservoir of the ink supply to maintain the viscosity of the ink contained therein. The ink utilized was manufactured by Colorcon, Inc., West Point, Pa. 19486 known as Confectionery Ink, Formula No. C1-8098, Color Black, Batch No. 183735.

The raw cracker dough as a mass was added to an apparatus for converting the dough into a continuous dough sheet, which was then advanced to a belt conveyor of the printing and cutting apparatus. The conveyor belt of the belt conveyor was operated at a speed of about 18 feet per minute.

Prior to advancing the dough sheet onto the conveyor belt of the printing and cutting apparatus, the rotary cutter was started and its peripheral speed adjusted to approximately the speed of the conveyor belt.

Once the continuous dough sheet was being advanced through the printing and cutting apparatus underneath the printer, the printer was operated. The printing roller was placed in contact with the advancing dough sheet, and subsequently the printing roller was placed in peripheral contact with the inking roller to begin the printing operation.

The printer was constructed with an inking roller having four (4) inking roller sections and a printing roller having four printing roller sections as illustrated in FIG. 16. One roller was engraved with the design of an apple, another with slices of lemon, another engraved with a cherry bunch, and another with strawberries.

The printing roller sections each had an outer, food-grade silicone robber blanket or sleeve printing surface. The silicone robber rolls had an average Shore 00 Durometer reading of about 40.

The dough sheet was successfully printed with these designs having high resolution and good appearance. After the conveyor belt speed achieved a steady state with the load of the printer and cutter applied to the advancing dough sheet, the infinitely variable differential drive was adjusted by rotating its knob to change the relative positions of the inking and printing rolls to bring the printed dough sheet into longitudinal or machine direction registration with the rotary cutter.

The printed and cut dough sheet was conveyed on the conveyor belt to a station where the waste portion of the dough sheet was lifted away by an inclined conveyor and transported to a waste receptacle for later recycling. The remaining printed individual dough pieces on the conveyor were transported through a baking oven where the dough pieces were fully baked at temperatures of about 325° F. to about 550° F. with the printed designs maintaining high resolution and good appearance.

EXAMPLE 2

This Example illustrates the production of printed cookies by rotary molding cookie dough pieces and printing upon the individual dough pieces using a printing and rotary molding apparatus as shown in FIG. 31.

The ink supply, ink pump, ink motor, and ink viscosity controller were the same as used in Example 1. However, the ink of Example 1 was replaced with a food coloring dye.

A raw cookie dough was added to the hopper of the rotary molder for converting the dough mass into rows of individual dough pieces. The individual dough pieces formed by the rotary molder were successfully transferred by a composite fabric belt to the printer in a specific configuration that allowed proper printing alignment and registration.

The peripheral speed of the rotary molder was about the same as the linear speed of the conveyor belt. Once the rows of individual dough pieces were advanced underneath the printer, the printer was operated. The printing roller was placed in contact with the advancing dough pieces. Subsequently, the printing roller was placed in peripheral contact with the inking roller to begin the printing operation.

The printer was constructed with an inking roller having four (4) inking roller sections and a printing roller having four printing roller sections as illustrated in FIG. 31 with silicone rubber blankets as described in Example 1.

The individual pieces were successfully printed with designs having high resolution and good appearance. After the conveyor belt speed achieved a steady state with the load of the printer and rotary molder applied to it, the infinitely variable differential drive was adjusted by rotating its knob to change the relative positions of the inking and printing rolls with respect to the position of the rotary molder to bring the printed dough pieces into longitudinal or machine direction registration with the rotary molder.

The printed individual dough pieces were conveyed in rows on the conveyor belt and transferred to an oven band. The individual dough pieces on the oven band were transported through a multi-zoned baking oven where the dough pieces were fully baked at temperatures of about 325° F. to about 550° F. with the printed designs maintaining high resolution and good appearance.

EXAMPLE 3

Printed cookies may be produced as in Example 2 except the mechanical synchronization of the rotary molder and the printer may be replaced by electronic synchronization wherein: 1) the inking roller of the printer is driven by an electric motor via a grooved pulley and grooved belt arrangement, 2) the rotary molder is separately driven by a second electric motor and belt and pulley arrangement, 3) a registration system utilizing photoelectrics and Emerson digital speed controls, described above and sold by Wolock and Lott Transmission Equipment Corporation, North Branch, N.J., is used to continuously monitor and determine whether the printed designs on an end row of dough pieces are properly registered (i.e., the leading edge of the design is at an acceptable distance from the leading edge of the dough piece) in the longitudinal or machine direction, and 4) the infinitely variable speed drive is adjusted electronically based upon the electronic comparison of data from a Color Mark Scanner MCS 638A-1 photoelectric eye and an Encoder Products Corp. absolute encoder to instantaneously or momentarily change the rotational speed of the inking and printing rolls. This changes the rotational position of the printing roll relative to the rotational position of the rotary molder at a given instant of time. It brings and maintains the printed dough pieces in longitudinal registration with the rotary molder.

In addition, the printer may be constructed with an inking roller having three inking roller sections and three printing roller sections instead of four. Each section may be about 12 inches in length. Each of the inking rollers may comprise a row of five different designs engraved along its length. Each row may repeat itself circumferentially every fourth row. The shapes of the dough pieces may be different for each piece within a given row and/or from row to row. The shapes in the rotary molder roll are coordinated with the engraved indicia of the inking roller. For example, 1) a Christmas tree shape is located in a position on the rotary molder, and 2) a design for a Christmas tree is engraved in a position on the inking roller so that the tree design will be printed upon the tree-shaped dough piece.

EXAMPLE 4

Multi-colored printing upon white fudge enrobed sandwich cookies may be performed by forming sandwich cookies using conventional rotary molding equipment to form the base cakes, conventional icing depositors to form the filler, and conventional sandwiching equipment to obtain sandwich cookies having a layer of filler between two base cakes. The baked sandwich cookies may then be enrobed in a conventional enrober with white fudge. The enrobed sandwich cookies may then be cooled in a cooling tunnel to set the fudge coating to a proper consistency for being printed upon. The cooled pieces may then be aligned on a conveyor using gating and channeling devices to align the enrobed pieces in four rows, for example, across the conveyor for proper printing registration. Three rotary printers (14) may be mounted in series along the conveyor. Each of the printers may print with an individual different color, such as either a red, green, or yellow ink. The combinations of three primary colors may be used to obtain multi-color line and/or half-tone images such as a bouquet of flowers. A fourth printer may be mounted in series to print a black outline or highlight for the other colors. The printed enrobed sandwich cookies may then be cooled in a cooling runnel to set the ink and fudge to a proper viscosity for packaging.

What is claimed is:

1. A method of making printed foods comprising:

rotary molding a dough into individual pieces in a predetermined arrangement comprising a plurality of aligned longitudinal rows and a plurality of aligned lateral rows;

transferring the individual pieces on a conveyor in the predetermined arrangement to at least one rotary printer;

maintaining the individual pieces in the predetermined arrangement during transfer to said printer;

registering the longitudinal rows of individual pieces with said printer; and printing on the individual pieces in the predetermined arrangement with said printer, said printing comprising transferring ink to an inking roller which is engraved with rows of indicia for holding ink within the grooves forming the indicia wherein the rows of engraved indicia are spaced from each other by a circumferential groove, removing excess ink from the surface of the inking roller to form printed indicia within said grooves, directing at least a portion of the excess ink into each circumferential groove of the inking roller so as to avoid contact of the excess ink with said dough pieces, the depth of each circumferential groove being sufficiently shallow such that said at least a portion of said excess ink remains in each circumferential groove due to the surface tension of the ink preventing ink from spinning off during rotation of the inking roller during printing, transferring laterally aligned rows of printed indicia from the inking roller to a continuously rotating printing roller having a resilient surface which conforms to said individual pieces, the rows of printed indicia on said printing roller being spaced from each other by a circumferential groove with each groove of the printing roller being wider than each groove of the inking roller so that the edges of the printing roller defined by each circumferential groove do not contact the ink contained in each groove of the inking roller, and transferring the laterally aligned rows of printed indicia from the resilient surface to the predetermined arrangement of individual pieces by simultaneously contacting the individual pieces in each lateral row with the resilient surface of the continuously rotating printing roller.

2. A method according to claim 1, wherein the individual dough pieces are maintained in the preselected arrangement by adhering to a conveying web.

3. A method according to claim 2, wherein the individual dough pieces are adhered to the conveying web by being pressed into the mesh of the conveying web.

4. A method according to claim 1, wherein the individual dough pieces are registered with the printer by synchronizing the rotary molder and printer.

5. A method according to claim 4, wherein the rotary molder and rotary printer are mechanically timed to ensure proper printing registration.

6. A method according to claim 1 wherein the individual pieces are printed upon by a plurality of serially arranged rotary printers to obtain multi-colored printed food pieces.

7. A method according to claim 1 wherein the pieces which are printed upon are coated with a confectionery coating.

8. A method according to claim 1 wherein registering comprises monitoring a longitudinal row of pieces on the side of the conveyor.

9. A method of making printed foods made from dough, comprising:

mixing ingredients to form a dough;

forming the dough into a sheet; and printing rows of indicia on a surface of the dough sheet with at least one rotary printer, said printing comprising transferring ink to an inking roller which is engraved with rows of indicia for holding ink within the grooves forming the indicia wherein the rows of engraved indicia are spaced from each other by a circumferential groove, removing excess ink from the surface of the inking roller to form printed indicia within said grooves, directing at least a portion of the excess ink into each circumferential groove of the inking roller so as to avoid contact of the excess ink with said dough sheet, the depth of each circumferential groove being sufficiently shallow such that said at least a portion of said excess ink remains in each circumferential groove due to the surface tension of the ink preventing ink from spinning off during rotation of the inking roller during printing, transferring laterally aligned rows of printed indicia from the inking roller to a continuously rotating printing roller having a resilient surface which conforms to the surface of said dough sheet, the rows of printed indicia on said printing roller being spaced from each other by a circumferential groove with each groove of the printing roller being wider than each groove of the inking roller so that the edges of the printing roller defined by each circumferential groove do not contact the ink contained in each groove of the inking roller, and transferring the laterally aligned rows of printed indicia from the resilient surface to said dough sheet by contacting the dough sheet with the resilient surface of the continuously rotating printing roller.

10. A method according to claim 9, including the step of forming the dough sheet into individual pieces.

11. A method according to claim 9, wherein said dough sheet is at least partially cut into individual pieces before printing.

12. A method according to claim 10, wherein the dough sheet is formed after the step of printing on the dough sheet.

13. A method according to claim 9, including the step of at least partially baking said dough prior to printing.

14. A method according to claim 9, wherein said dough is baked after printing.

15. A method according to claim 9, wherein said dough sheet is printed upon by a plurality of serially arranged rotary printers to obtain multi-colored printed foods.

16. A method according to claim 9 wherein printing pressure between the dough sheet and the continuously rotating printing roller is adjustable.

17. A method of making printed foods comprising:

forming individual dough pieces;

transferring the individual pieces on a conveyor in a predetermined arrangement comprising a plurality of aligned longitudinal rows and a plurality of aligned lateral rows to at least one rotary printer;

maintaining the individual pieces in the predetermined arrangement during transfer to said printer;

registering the longitudinal rows of individual pieces with said printer; and printing on the individual pieces in the predetermined arrangement with said printer, said printing comprising transferring ink to an inking roller which is engraved with rows of indicia for holding ink within the grooves forming the indicia wherein the rows of engraved indicia are spaced from each other by a circumferential groove, removing excess ink from the surface of the inking roller to form printed indicia within said grooves, directing at least a portion of the excess ink into each circumferential groove of the inking roller so as to avoid contact of the excess ink with said dough pieces, the depth of each circumferential groove being sufficiently shallow such that said at least a portion of said excess ink remains in each circumferential groove due to the surface tension of the ink preventing ink from spinning off during rotation of the inking roller during printing, transferring laterally aligned rows of printed indicia from the inking roller to a continuously rotating printing roller having a resilient surface which conforms to said individual pieces, the rows of printed indicia on said printing roller being spaced from each other by a circumferential groove with each groove of the printing roller being wider than each groove of the inking roller so that the edges of the printing roller defined by each circumferential groove do not contact the ink contained in each groove of the inking roller, and transferring the laterally aligned rows of printed indicia from the resilient surface to the predetermined arrangement of individual pieces by simultaneously contacting the individual pieces in each lateral row with the resilient surface of the continuously rotating printing roller without deforming the pieces.

18. A method according to claim 17 wherein the individual dough pieces are selected from the group consisting of raw dough pieces, partially cooked dough pieces and fully cooked dough pieces.

19. A method according to claim 17 wherein registering comprises monitoring a longitudinal row of pieces on the side of the conveyor.

20. A method according to claim 17 wherein excess ink on the surface of said inking roller is removed by a doctor blade.

* * * * *